United States Patent
Chang et al.

(10) Patent No.: US 12,181,704 B1
(45) Date of Patent: Dec. 31, 2024

(54) LIGHT BAR MODULE

(71) Applicant: Chicony Power Technology Co., Ltd., New Taipei (TW)

(72) Inventors: Ting-Wei Chang, New Taipei (TW); Chun-Ting Lin, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/421,588

(22) Filed: Jan. 24, 2024

(30) Foreign Application Priority Data

Nov. 16, 2023 (TW) .................................. 112144385

(51) Int. Cl.
- F21V 8/00 (2006.01)
- F21S 2/00 (2016.01)
- F21S 4/28 (2016.01)

(52) U.S. Cl.
CPC ............ *G02B 6/0058* (2013.01); *F21S 2/005* (2013.01); *F21S 4/28* (2016.01)

(58) Field of Classification Search
CPC ............ G02B 6/0058; F21S 2/005; F21S 4/28
See application file for complete search history.

(56) References Cited

U.S. PATENT DOCUMENTS

| | | | |
|---|---|---|---|
| 8,226,277 B2 * | 7/2012 | Chen | G02B 19/0061 362/310 |
| 10,788,170 B1 * | 9/2020 | Bryan | F21K 9/69 |
| 11,905,035 B2 * | 2/2024 | Jha | B64D 47/02 |
| 2008/0086922 A1 * | 4/2008 | Chen | G09F 13/22 40/550 |
| 2011/0116272 A1 * | 5/2011 | Bak | G02B 19/0028 362/311.1 |
| 2018/0245754 A1 * | 8/2018 | Gensler | F21V 3/10 |
| 2021/0293391 A1 | 9/2021 | Weijers et al. | |
| 2022/0228723 A1 * | 7/2022 | Bryan | G02B 27/0012 |

FOREIGN PATENT DOCUMENTS

| | | |
|---|---|---|
| CN | 1847949 A | 10/2006 |
| CN | 104345494 A | 2/2015 |
| CN | 105444044 A | 3/2016 |
| CN | 105934628 A | 9/2016 |
| CN | 207624700 U | 7/2018 |
| CN | 109506201 A | 3/2019 |
| CN | 109804199 A | 5/2019 |
| CN | 111240086 A | 6/2020 |
| CN | 111434984 A | 7/2020 |
| CN | 216924232 U | 7/2020 |

(Continued)

*Primary Examiner* — Evan P Dzierzynski

(74) *Attorney, Agent, or Firm* — Birch, Stewart, Kolasch & Birch, LLP

(57) ABSTRACT

A light bar module includes an outer light guide member, an inner light guide member, and a circuit board. The outer light guide member is provided with a first accommodating space and a light-emitting surface on two sides respectively. The inner light guide member is provided with a second accommodating space, and the inner light guide member is accommodated in the first accommodating space. The circuit board is provided with a plurality of light-emitting elements, and each of the light-emitting elements is accommodated in the second accommodating space and is configured to emit light from the light-emitting surface.

19 Claims, 18 Drawing Sheets

(56) References Cited

FOREIGN PATENT DOCUMENTS

| | | | |
|---|---|---|---|
| CN | 111986713 | A | 11/2020 |
| CN | 217584314 | U | 10/2022 |
| TW | I258023 | B | 7/2006 |
| TW | I475257 | B | 3/2015 |
| TW | 202045856 | A | 12/2020 |
| WO | WO 2006/122392 | A1 | 11/2006 |
| WO | WO 2019/014867 | A1 | 1/2019 |

\* cited by examiner

LIGHT BAR MODULE

CROSS-REFERENCE TO RELATED APPLICATION

This non-provisional application claims priority under 35 U.S.C. § 119 (a) to patent application No. 112144385 filed in Taiwan, R.O.C. on Nov. 16, 2023, the entire contents of which are hereby incorporated by reference.

BACKGROUND

Technical Field

This disclosure relates to a light bar module, and in particular, to a light bar module with a multiple-piece lens.

Related Art

In recent years, backlight modules (BLM) are widely applied to various products, and are often applied to logos or light bars on appearances of the products, so that these products have special luminous visual effects. An existing light bar module has a one-piece injection-molded lens (made of an optical plastic material) and a light-emitting diode light bar. The lens is used as an "optical lens" or a "diffusion lens" in the light bar module. An integrated lens structure is often manufactured by injection-molding the optical plastic material, to avoid forming cross-sections or gaps in the middle of the lens to cause loss of light energy, or generate uncontrollable light refraction to affect an optical effect of the light bar module.

In a design process of the light bar module, how to make the light effect uniform and effectively eliminate a hotspot needs to be mainly taken into consideration. In order to eliminate the hotspot, a vertical distance and a horizontal distance of the lens need to be greater than 6.0 mm in at least one axial direction, and it is even necessary to add a high concentration ratio of diffusing agent or diffusing powder to assist in light diffusion and dilute the hotspot.

SUMMARY

In view of the above, in some embodiments, a light bar module includes an outer light guide member, an inner light guide member, and a circuit board. The outer light guide member is provided with a first accommodating space and a light-emitting surface on two sides respectively. The inner light guide member is provided with a second accommodating space, and the inner light guide member is accommodated in the first accommodating space. The circuit board is provided with a plurality of light-emitting elements, and each of the light-emitting elements is accommodated in the second accommodating space and is configured to emit light from the light-emitting surface.

In some embodiments, the outer light guide member includes a first light guide sub-member and a second light guide sub-member. The first light guide sub-member is provided with a first sub-space. The second light guide sub-member is provided with a second sub-space. The first light guide sub-member and the second light guide sub-member are arranged side by side, and the first sub-space and the second sub-space form the first accommodating space.

In some embodiments, the outer light guide member is provided with a plurality of light effect structures located on the light-emitting surface.

In some embodiments, the outer light guide member includes a left horizontal side wall, a right horizontal side wall, and a vertical side wall. The left horizontal side wall and the right horizontal side wall are parallel to each other. The vertical side wall is perpendicular to the left horizontal side wall and the right horizontal side wall. The vertical side wall includes an inner wall, and the inner wall is perpendicular to the left horizontal side wall and the right horizontal side wall. The vertical side wall connects to the left horizontal side wall and the right horizontal side wall. An axis perpendicular to the inner wall is defined as a first axial direction, an axis perpendicular to the left horizontal side wall or the right horizontal side wall is defined as a second axial direction, and the first axial direction is perpendicular to the second axial direction. The circuit board is parallel to the second axial direction, and a light-emitting direction of each of the light-emitting elements is parallel to the circuit board.

In some embodiments, the outer light guide member includes a left horizontal side wall, a right horizontal side wall, and a vertical side wall. The left horizontal side wall and the right horizontal side wall are parallel to each other. The vertical side wall is perpendicular to the left horizontal side wall and the right horizontal side wall. The vertical side wall includes an inner wall, and the inner wall is perpendicular to the left horizontal side wall and the right horizontal side wall. The vertical side wall connects to the left horizontal side wall and the right horizontal side wall. An axis perpendicular to the inner wall is defined as a first axial direction, an axis perpendicular to the left horizontal side wall or the right horizontal side wall is defined as a second axial direction, and the first axial direction is perpendicular to the second axial direction. An acute angle is formed between the circuit board and the second axial direction, and a light-emitting direction of each of the light-emitting elements is perpendicular or parallel to the circuit board.

In some embodiments, thicknesses of the outer light guide member and the inner light guide member in the first axial direction are less than 4.5 millimeters.

In some embodiments, the first light guide sub-member is further provided with a first horizontal side wall and a second horizontal side wall that are parallel to each other, and a first vertical side wall that is perpendicular to the first horizontal side wall and the second horizontal side wall and connects to the first horizontal side wall and the second horizontal side wall. The first vertical side wall includes a first inner wall, and the first inner wall is perpendicular to the first horizontal side wall and the second horizontal side wall. The second light guide sub-member is further provided with a third horizontal side wall at a same height as the first horizontal side wall, a fourth horizontal side wall at a same height as the second horizontal side wall, and a second vertical side wall that is perpendicular to the third horizontal side wall and the fourth horizontal side wall and connects to the third horizontal side wall and the fourth horizontal side wall. The second vertical side wall includes a second inner wall, and the second inner wall is perpendicular to the third horizontal side wall and the fourth horizontal side wall. The light-emitting surface includes the first vertical side wall and the second vertical side wall. The first light guide sub-member is provided with a first fixation structure extending from a first end portion of the first horizontal side wall and a second fixation structure extending from a second end portion of the second horizontal side wall. The first light guide sub-member corresponds to the second light guide sub-member through the first fixation structure and the second fixation structure.

In some embodiments, the first fixation structure is provided with a first bump protruding toward the second horizontal side wall, and the second fixation structure is provided with a second bump protruding toward the first horizontal side wall. The second light guide sub-member further includes a first elastic piece and a second elastic piece that are connected to the second vertical side wall, and a first concave portion is formed between the first elastic piece and a third end portion of the third horizontal side wall and is configured to accommodate the first bump. In addition, a second concave portion is formed between the second elastic piece and a fourth end portion of the fourth horizontal side wall and is configured to accommodate the second bump.

In some embodiments, an axis perpendicular to the first inner wall is defined as a first axial direction, an axis connecting the first horizontal side wall to the second horizontal side wall is defined as a second axial direction, and the second axial direction is perpendicular to the first axial direction. An outer surface of the first fixation structure is coplanar with an outer surface of the first horizontal side wall, and an outer surface of the second fixation structure is coplanar with an outer surface of the second horizontal side wall. There is a first height difference between an outer surface of the third horizontal side wall and an outer surface of the first elastic piece in the second axial direction, and the first height difference is greater than or equal to a thickness of the first fixation structure in the second axial direction. There is a second height difference between an outer surface of the fourth horizontal side wall and an outer surface of the second elastic piece in the second axial direction, and the second height difference is greater than or equal to a thickness of the second fixation structure in the second axial direction.

In some embodiments, an axis perpendicular to the first inner wall is defined as a first axial direction, an axis connecting the first horizontal side wall to the second horizontal side wall is defined as a second axial direction, and the second axial direction is perpendicular to the first axial direction. A projection position of the first end portion in the second axial direction is different from a projection position of the second end portion in the second axial direction. A projection position of the third end portion in the second axial direction is different from a projection position of the fourth end portion in the second axial direction.

In some embodiments, an axis perpendicular to the first inner wall is defined as a first axial direction, an axis connecting the first horizontal side wall to the second horizontal side wall is defined as a second axial direction, and the second axial direction is perpendicular to the first axial direction. A projection position of the first bump in the second axial direction is different from a projection position of the second bump in the second axial direction. A projection position of the first elastic piece in the second axial direction is different from a projection position of the second elastic piece in the second axial direction.

In some embodiments, the outer light guide member further includes a third light guide sub-member. The third light guide sub-member is provided with a third sub-space. The first light guide sub-member, the second light guide sub-member, and the third light guide sub-member are arranged side by side in sequence, and the first sub-space, the second sub-space, and the third sub-space form the first accommodating space.

In some embodiments, the outer light guide member further includes a third light guide sub-member. The third light guide sub-member is provided with a fifth horizontal side wall at a same height as the third horizontal side wall, a sixth horizontal side wall at a same height as the fourth horizontal side wall, and a third vertical side wall that is perpendicular to the fifth horizontal side wall and the sixth horizontal side wall and connects to the fifth horizontal side wall and the sixth horizontal side wall. The third vertical side wall includes a third inner wall, and the third inner wall is perpendicular to the fifth horizontal side wall and the sixth horizontal side wall. The light-emitting surface includes the first vertical side wall, the second vertical side wall, and the third vertical side wall. The second light guide sub-member is provided with a third fixation structure extending from a fifth end portion of the third horizontal side wall and a fourth fixation structure extending from a sixth end portion of the fourth horizontal side wall. The second light guide sub-member corresponds to the third light guide sub-member through the third fixation structure and the fourth fixation structure.

In some embodiments, the third fixation structure is provided with a third bump protruding toward the fourth horizontal side wall, and the fourth fixation structure is provided with a fourth bump protruding toward the third horizontal side wall. The third light guide sub-member further includes a third elastic piece and a fourth elastic piece that are connected to the third vertical side wall, and a third concave portion is formed between the third elastic piece and a seventh end portion of the fifth horizontal side wall and is configured to accommodate the third bump. In addition, a fourth concave portion is formed between the fourth elastic piece and an eighth end portion of the sixth horizontal side wall and is configured to accommodate the fourth bump.

In some embodiments, an axis perpendicular to the third inner wall is defined as a first axial direction, an axis connecting the fifth horizontal side wall to the sixth horizontal side wall is defined as a second axial direction, and the second axial direction is perpendicular to the first axial direction. An outer surface of the third fixation structure is coplanar with an outer surface of the third horizontal side wall, and an outer surface of the fourth fixation structure is coplanar with an outer surface of the fourth horizontal side wall. There is a third height difference between an outer surface of the fifth horizontal side wall and an outer surface of the third elastic piece in the second axial direction, and the third height difference is greater than or equal to a thickness of the third fixation structure in the second axial direction. There is a fourth height difference between an outer surface of the sixth horizontal side wall and an outer surface of the fourth elastic piece in the second axial direction, and the fourth height difference is greater than or equal to a thickness of the fourth fixation structure in the second axial direction.

In some embodiments, an axis perpendicular to the third inner wall is defined as a first axial direction, an axis connecting the fifth horizontal side wall to the sixth horizontal side wall is defined as a second axial direction, and the second axial direction is perpendicular to the first axial direction. A projection position of the fifth end portion in the second axial direction is different from a projection position of the sixth end portion in the second axial direction. A projection position of the seventh end portion in the second axial direction is different from a projection position of the eighth end portion in the second axial direction.

In some embodiments, an axis perpendicular to the third inner wall is defined as a first axial direction, an axis connecting the fifth horizontal side wall to the sixth horizontal side wall is defined as a second axial direction, and the second axial direction is perpendicular to the first axial direction. A projection position of the third bump in the second axial direction is different from a projection position of the fourth bump in the second axial direction. A projection position of the third elastic piece in the second axial direction is different from a projection position of the fourth elastic piece in the second axial direction.

In some embodiments, a first cross-section at a side end of the first light guide sub-member is perpendicular to the light-emitting surface, and a second cross-section at a side end of the second light guide sub-member is perpendicular to the light-emitting surface.

In some embodiments, the outer light guide member is provided with a plurality of first grooves, the inner light guide member is provided with a plurality of protruding structures, and the circuit board is provided with a plurality of protruding portions and a plurality of second grooves. Each of the protruding portions is locked in each of the first grooves respectively, and each of the protruding structures is locked in each of the second grooves respectively.

In some embodiments, the outer light guide member includes a first light guide sub-member, a second light guide sub-member, and a third light guide sub-member. The first light guide sub-member is provided with a first horizontal side wall and a second horizontal side wall that are parallel to each other, and a first vertical side wall that is perpendicular to the first horizontal side wall and the second horizontal side wall and connects to the first horizontal side wall and the second horizontal side wall. The first vertical side wall includes a first inner wall, and the first inner wall is perpendicular to the first horizontal side wall and the second horizontal side wall. The first horizontal side wall, the second horizontal side wall, and the first vertical side wall form a first sub-space. The second light guide sub-member is provided with a third horizontal side wall at a same height as the first horizontal side wall, a fourth horizontal side wall at a same height as the second horizontal side wall, and a second vertical side wall that is perpendicular to the third horizontal side wall and the fourth horizontal side wall and connects to the third horizontal side wall and the fourth horizontal side wall. The second vertical side wall includes a second inner wall, and the second inner wall is perpendicular to the third horizontal side wall and the fourth horizontal side wall. The third horizontal side wall, the fourth horizontal side wall, and the second vertical side wall form a second sub-space. The third light guide sub-member is provided with a fifth horizontal side wall at a same height as the third horizontal side wall, a sixth horizontal side wall at a same height as the fourth horizontal side wall, and a third vertical side wall that is perpendicular to the fifth horizontal side wall and the sixth horizontal side wall and connects to the fifth horizontal side wall and the sixth horizontal side wall. The third vertical side wall includes a third inner wall, and the third inner wall is perpendicular to the fifth horizontal side wall and the sixth horizontal side wall. The fifth horizontal side wall, the sixth horizontal side wall, and the third vertical side wall form a third sub-space. The first light guide sub-member, the second light guide sub-member, and the third light guide sub-member are arranged side by side in sequence. The first sub-space, the second sub-space, and the third sub-space form the first accommodating space. The light-emitting surface includes the first vertical side wall, the second vertical side wall, and the third vertical side wall. The outer light guide member is provided with a plurality of light effect structures located on the light-emitting surface. An axis perpendicular to the first inner wall is defined as a first axial direction, an axis connecting the first horizontal side wall to the second horizontal side wall is defined as a second axial direction, the first axial direction is perpendicular to the second axial direction, and a light-emitting direction of each of the light-emitting elements is the second axial direction. The first light guide sub-member is provided with a first fixation structure extending from a first end portion of the first horizontal side wall and a second fixation structure extending from a second end portion of the second horizontal side wall, and the first light guide sub-member corresponds to the second light guide sub-member through the first fixation structure and the second fixation structure. The second light guide sub-member is provided with a third fixation structure extending from a fifth end portion of the third horizontal side wall and a fourth fixation structure extending from a sixth end portion of the fourth horizontal side wall, and the second light guide sub-member corresponds to the third light guide sub-member through the third fixation structure and the fourth fixation structure. The first fixation structure is provided with a first bump protruding toward the second horizontal side wall, the second fixation structure is provided with a second bump protruding toward the first horizontal side wall, the third fixation structure is provided with a third bump protruding toward the fourth horizontal side wall, and the fourth fixation structure is provided with a fourth bump protruding toward the third horizontal side wall. The second light guide sub-member further includes a first elastic piece and a second elastic piece that are connected to the second vertical side wall, and a first concave portion is formed between the first elastic piece and a third end portion of the third horizontal side wall and is configured to accommodate the first bump. In addition, a second concave portion is formed between the second elastic piece and a fourth end portion of the fourth horizontal side wall and is configured to accommodate the second bump. The third light guide sub-member further includes a third elastic piece and a fourth elastic piece that are connected to the third vertical side wall, and a third concave portion is formed between the third elastic piece and a seventh end portion of the fifth horizontal side wall and is configured to accommodate the third bump. In addition, a fourth concave portion is formed between the fourth elastic piece and an eighth end portion of the sixth horizontal side wall and is configured to accommodate the fourth bump. An outer surface of the first fixation structure is coplanar with an outer surface of the first horizontal side wall, an outer surface of the second fixation structure is coplanar with an outer surface of the second horizontal side wall, an outer surface of the third fixation structure is coplanar with an outer surface of the third horizontal side wall, and an outer surface of the fourth fixation structure is coplanar with an outer surface of the fourth horizontal side wall. There is a first height difference between an outer surface of the third horizontal side wall and an outer surface of the first elastic piece in the second axial direction, and the first height difference is greater than or equal to a thickness of the first fixation structure in the second axial direction. There is a second height difference between an outer surface of the fourth horizontal side wall and an outer surface of the second elastic piece in the second axial direction, and the second height difference is greater than or equal to a thickness of the second fixation structure in the second axial direction. There is a third height difference between an outer surface of the fifth horizontal side wall and an outer surface of the third elastic piece in the second axial direction, and the third height difference is greater than or equal to a thickness of the third fixation structure in the second axial direction. There is a fourth height difference between an outer surface of the sixth horizontal side wall and an outer surface of the fourth elastic piece in the second axial direction, and the fourth height difference is greater than or equal to a thickness of the fourth fixation structure in the second axial direction. A first cross-section at a side end of the first light guide sub-member is perpendicular to the light-emitting surface, and a second cross-section at a side end of the second light guide sub-member is perpendicular to the light-emitting surface. The outer light guide member is provided with a plurality of first grooves, the inner light guide member is provided with a plurality of protruding structures, the circuit board is provided with a plurality of protruding portions and a plurality of second grooves, each of the protruding portions is locked in each of the first grooves respectively, and each of the protruding structures is locked in each of the second grooves respectively.

Therefore, according to some embodiments, by splitting a light guide member into two pieces: an outer light guide member and an inner light guide member, a mechanism thickness or size of the light guide member required to mix light or eliminate hotspots can be reduced, so that generation of the hotspots can still be effectively avoided when a mechanism space of the light bar module is insufficient. According to some embodiments, in the light bar module, the difficulty of injection molding of a slender and large-sized optical plastic material and the amount of bending deformation of an injection-molded member can be reduced by splitting the outer light guide member into multiple pieces. In addition, various structures can be made on the light-emitting surface of the outer light guide member. According to some embodiments, the light bar module achieves light diffusion by continuously refracting or reflecting light at an interface between the outer light guide member and the inner light guide member to uniformize an intensity of the light-emitting surface. An air layer located at a boundary between the outer light guide member and the inner light guide member is the most natural light mixing medium. According to some embodiments, if diffusing powder needs to be added to the optical plastic material, it can be added only to the outer light guide member or the inner light guide member, or it can be added to only one of or part of the outer light guide member to effectively eliminate the hotspots, maintain brightness, and reduce the mechanism space. According to some embodiments, in the light bar module, the cross-section at the side end of the outer light guide member is perpendicular to the light-emitting surface, so that loss of light energy, cut-off of a light path, light leakage, or uncontrollable light refraction that affects an optical effect of the light bar module can be avoided, and a continuous light source can be generated.

DETAILED DESCRIPTION

The "light-emitting direction" mentioned in some embodiments of this disclosure refers to a direction in which a light-emitting element emits light. Since the light emitted from the light-emitting element includes a plurality of light paths, the "light-emitting direction" mentioned in some embodiments of this disclosure refers to a light path perpendicular to a surface of the light-emitting element.

Some embodiments of this disclosure define a structure A (assuming that it is but not limited to an outer light guide member). The "configured to emit light from the structure A" means that the structure A has transparency or translucency, allowing light to penetrate without blocking the light.

The "continuous light source" mentioned in some embodiments of this disclosure means that a light source presented is a surface light source.

According to some embodiments, a light bar module can be applied to various electronic products, home appliances, vehicle lights, tires, or fans, to present a good special luminous visual effect. According to some embodiments, the light bar module can be applied to e-sports electronic products.

Figure 1:
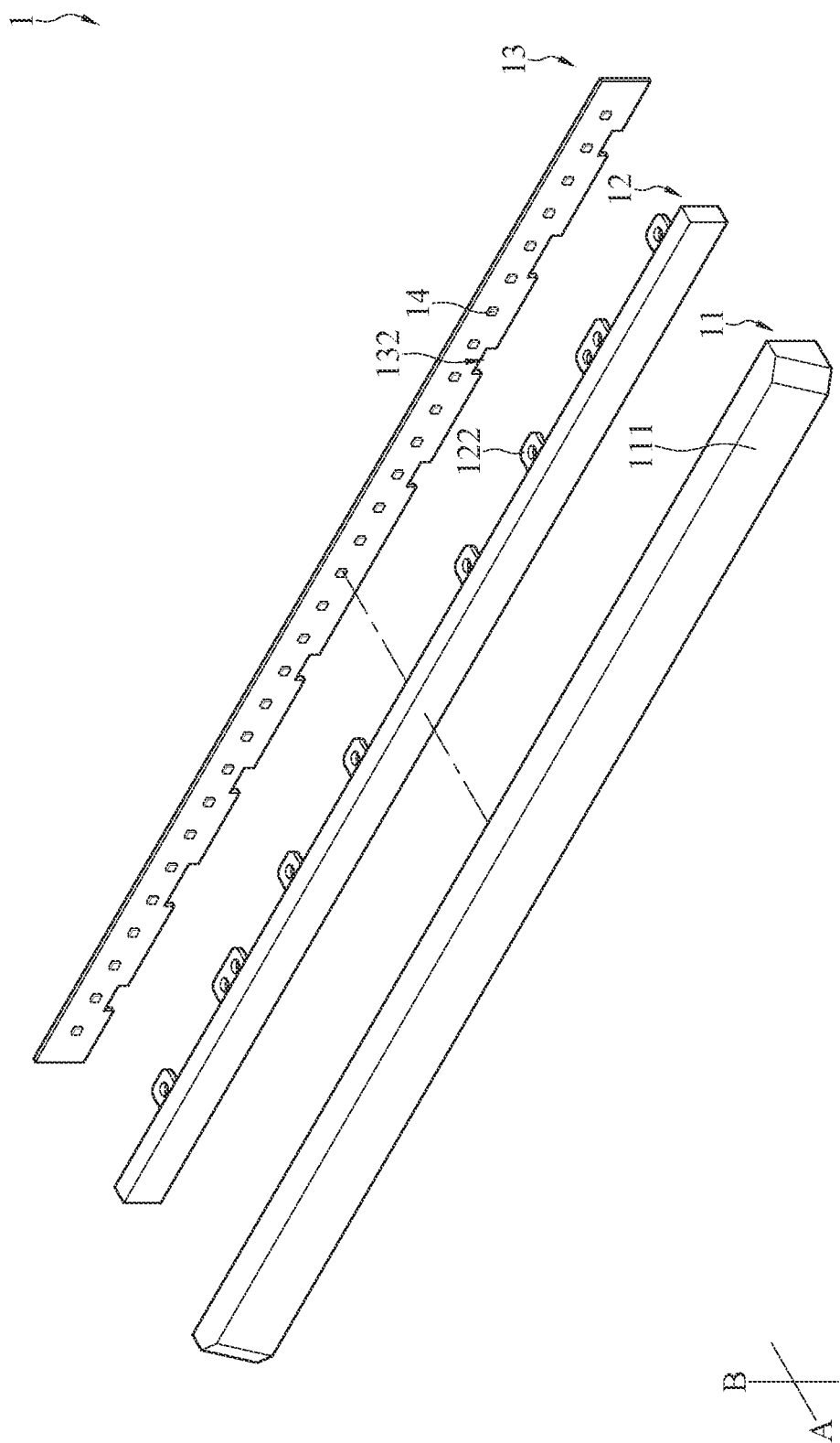
FIG. 1 is a front three-dimensional exploded schematic diagram of a first embodiment of a light bar module.
Figure 2:
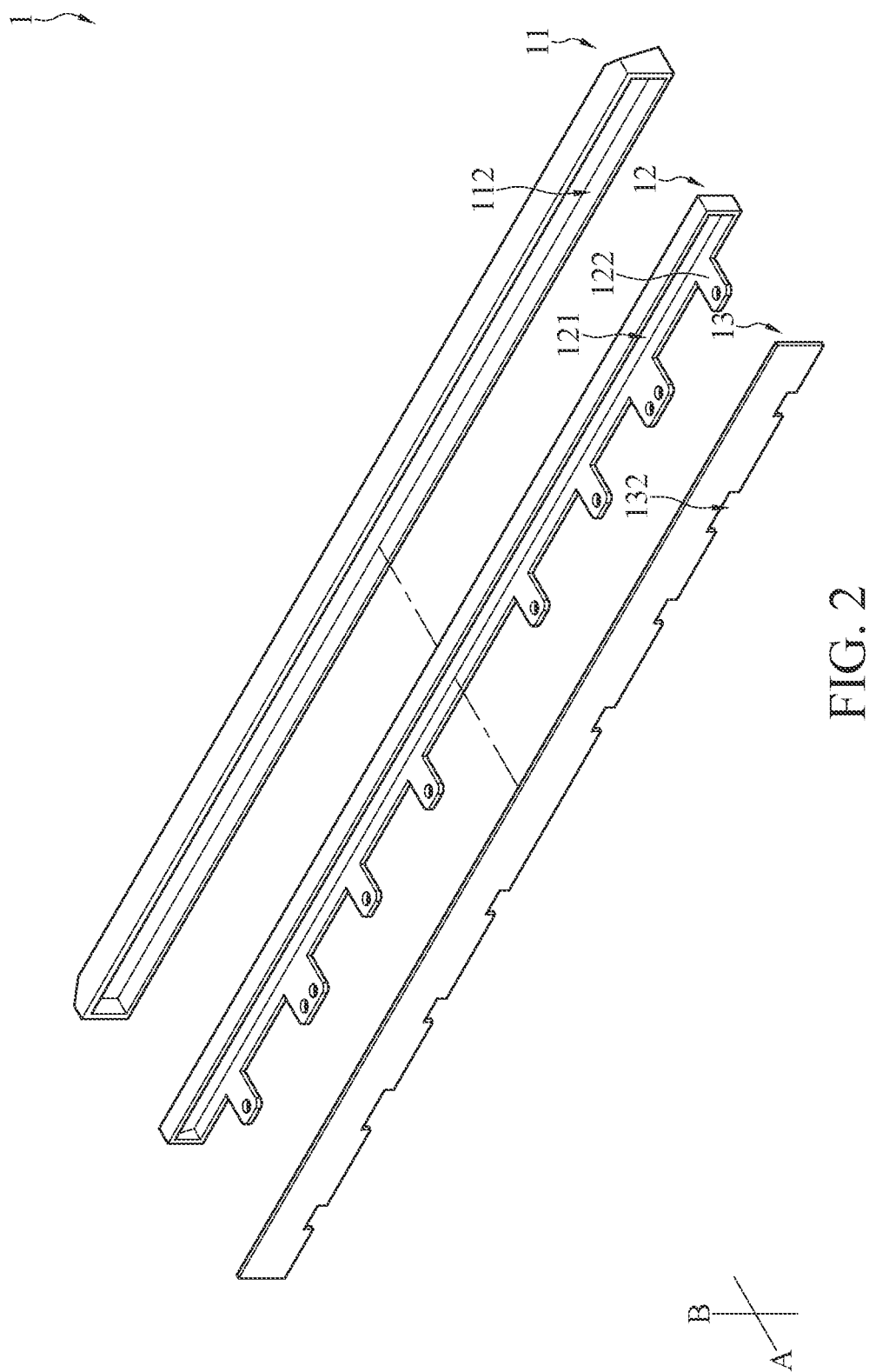
FIG. 2 is a rear three-dimensional exploded schematic diagram of a first embodiment of a light bar module.

Refer to FIG. 1 and FIG. 2, which are front and rear three-dimensional exploded schematic diagrams of a first embodiment of a light bar module 1. The light bar module 1 includes an outer light guide member 11, an inner light guide member 12, a circuit board 13, and a plurality of light-emitting elements 14. The outer light guide member 11 is provided with a first accommodating space 112 and a light-emitting surface 111 on two sides respectively. The inner light guide member 12 is provided with a second accommodating space 121 (an opening direction of the second accommodating space 121 is the same as an opening direction of the first accommodating space 112), and the inner light guide member 12 is accommodated in the first accommodating space 112. The circuit board 13 is located on outer sides of the inner light guide member 12 and the outer light guide member 11 and is in contact with a side end surface of the inner light guide member 12 and a side end surface of the outer light guide member 11. The plurality of light-emitting elements 14 are arranged on the circuit board 13 and accommodated in the second accommodating space 121 (as shown in FIG. 3A), and are configured to emit light from the light-emitting surface 111.

Referring to FIG. 1 and FIG. 2, in some embodiments, by splitting a light guide member into two pieces: an outer light guide member 11 and an inner light guide member 12, the light bar module 1 achieves light diffusion by refracting or reflecting light at an interface between the outer light guide member 11 and the inner light guide member 12 to uniformize an intensity of the light-emitting surface, and a mechanism thickness or size of the light guide member required to mix the light or eliminate the hotspots can be reduced, so that generation of the hotspots can still be effectively avoided when a mechanism space of the light bar module 1 is insufficient.

Figure 3A:
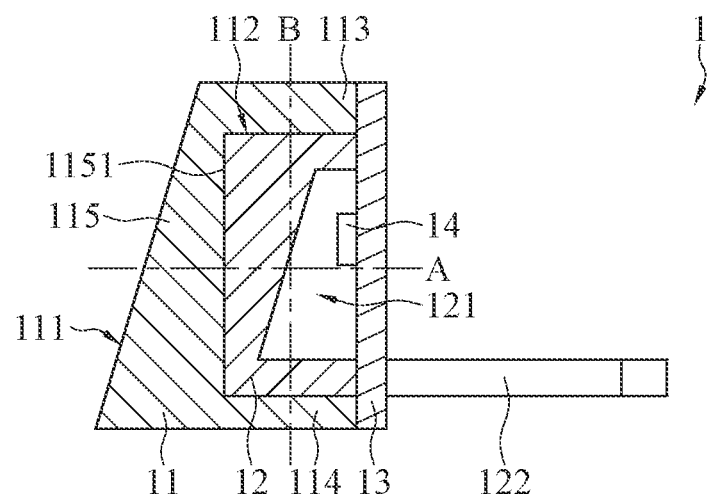
FIG. 3A is a side cross-sectional schematic diagram of a first embodiment of a light bar module.

Refer to FIG. 3A, which is a side cross-sectional schematic diagram of a first embodiment of a light bar module. The outer light guide member 11 further includes a left horizontal side wall 113, a right horizontal side wall 114, and a vertical side wall 115. The left horizontal side wall 113 and the right horizontal side wall 114 are parallel to each other. The vertical side wall 115 is perpendicular to the left horizontal side wall 113 and the right horizontal side wall 114 and connects to the left horizontal side wall 113 and the right horizontal side wall 114. In addition, the left horizontal side wall 113, the right horizontal side wall 114, and the vertical side wall 115 form the first accommodating space 112. The vertical side wall 115 includes an inner wall 1151 located in the first accommodating space 112, and the inner wall 1151 is perpendicular to the left horizontal side wall 113 and the right horizontal side wall 114. The vertical side wall 115 forms the light-emitting surface 111. Viewed from the cross-section of the light bar module 1, a structural appearance of the light bar module 1 is roughly a right-angled trapezoid, and the light-emitting surface 111 is a slope.

Referring to FIG. 1 to FIG. 3A, in some embodiments, an axis perpendicular to the inner wall 1151 and facing each of the light-emitting surface 111 and the circuit board 13 is defined as an axial direction A (that is, the first axial direction), and an axis perpendicular to the left horizontal side wall 113 (or the right horizontal side wall 114) is defined as an axial direction B (that is, the second axial direction). The axial direction A is perpendicular to the axial direction B. The inner light guide member 12 further includes a plurality of protruding structures 122. The protruding structure 122 is a structure protruding toward the circuit board 13 in the axial direction A. The protruding structure 122 includes a single through hole or a plurality of through holes. In some embodiments, the circuit board 13 includes a plurality of second grooves 132. Each of the protruding structures 122 is locked in each of the second grooves 132 respectively. In some embodiments, by the through hole, the light bar module 1 can be fixed to a product.

Figure 3B:
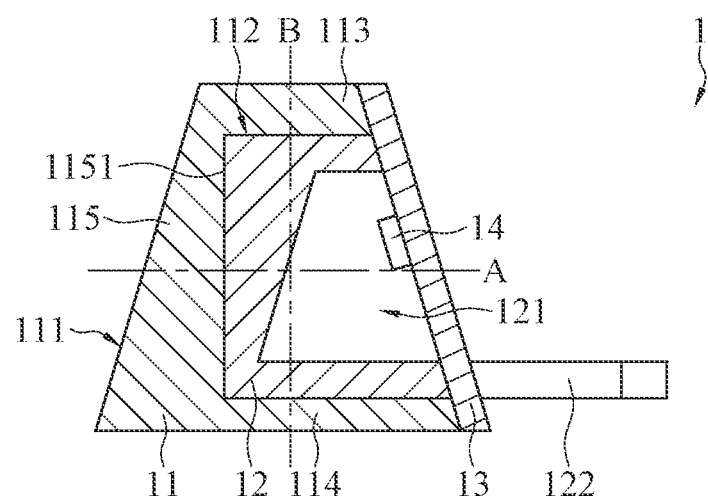
FIG. 3B is a side cross-sectional schematic diagram of a second embodiment of a light bar module.
Figure 4:
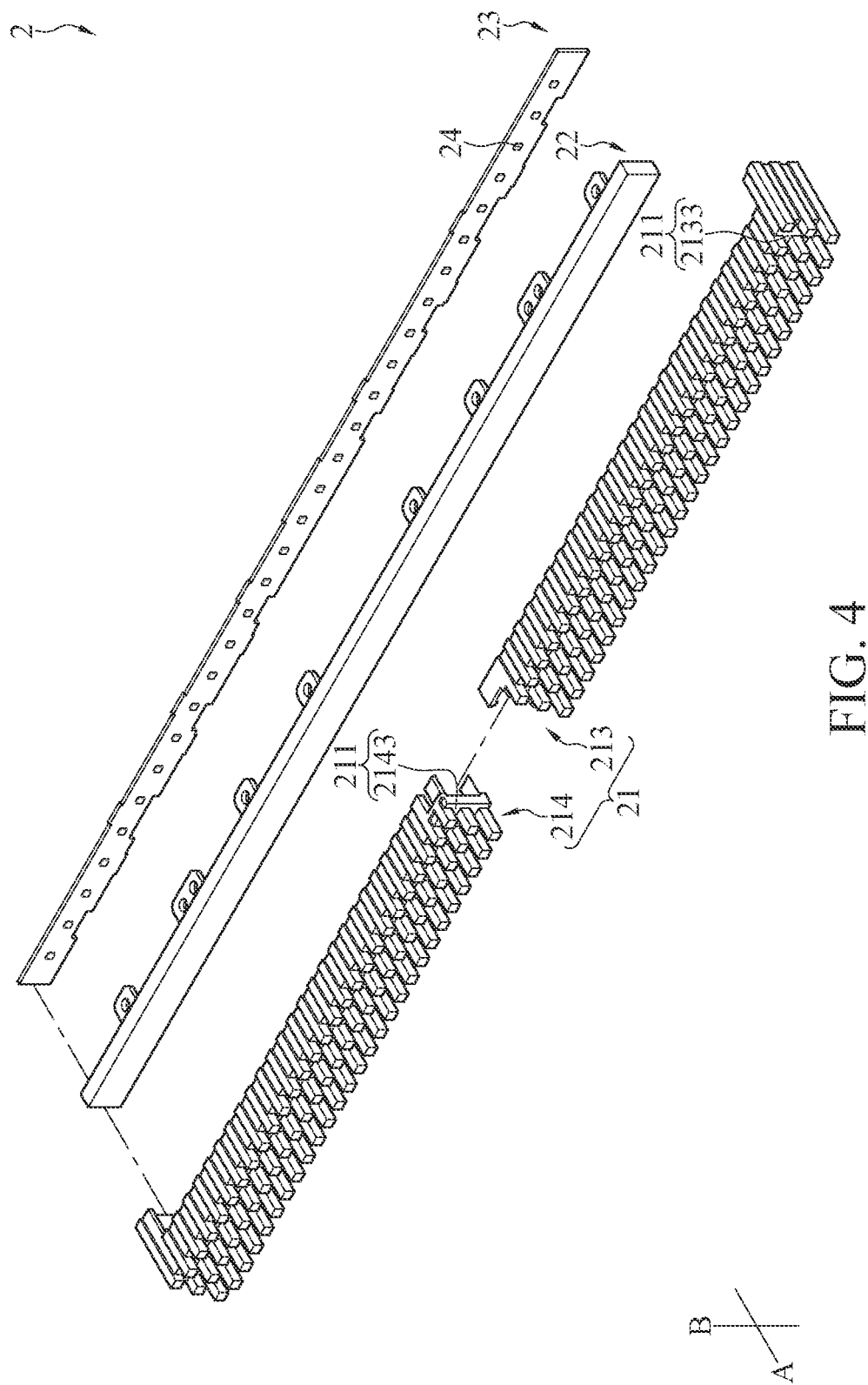
FIG. 4 is a front three-dimensional exploded schematic diagram of a third embodiment of a light bar module.
Figure 5:
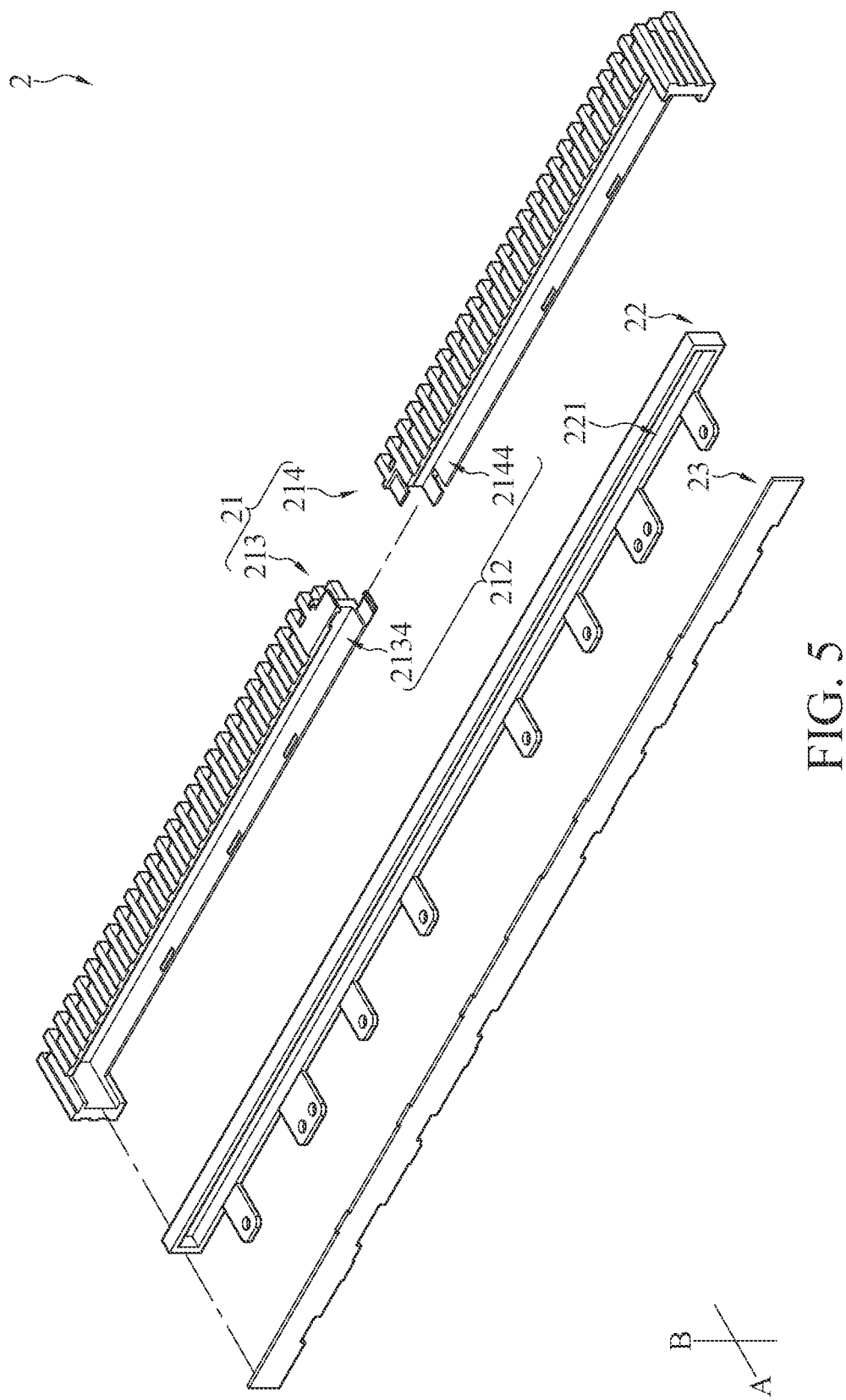
FIG. 5 is a rear three-dimensional exploded schematic diagram of a third embodiment of a light bar module.

Referring to FIG. 3A and FIG. 3B, in some embodiments, the light-emitting direction of the light-emitting element 14 is not perpendicular to the inner wall 1151, to achieve the light effect in the form of indirect light.

Referring to FIG. 3A, in some embodiments, when the circuit board 13 is parallel to the axial direction B, a light-emitting direction of a plurality of light-emitting elements 14 is parallel to the circuit board 13. In some embodiments, the light-emitting direction of the plurality of light-emitting elements 14 is the axial direction B. In some embodiments, the light-emitting direction of the plurality of light-emitting elements 14 is perpendicular to the axial direction A. In some embodiments, the light-emitting element 14 emits light toward the left horizontal side wall 113, but this disclosure is not limited thereto. In some other embodiments, the light-emitting element 14 emits light toward the right horizontal side wall 114. In some embodiments, the light bar module 1 achieves light diffusion by continuously refracting or reflecting light at an interface between the outer light guide member 11 and the inner light guide member 12 to uniformize an intensity of the light-emitting surface 111. In some embodiments, the light-emitting direction of the light-emitting element 14 and the inner wall 1151 are parallel to each other, to achieve the light effect in the form of indirect light.

Refer to FIG. 3B, which is a side cross-sectional schematic diagram of a second embodiment of a light bar module. In some embodiments, when an acute angle is formed between the circuit board 13 and the axial direction B, the light-emitting direction of the plurality of light-emitting elements 14 is perpendicular to the circuit board 13, but this disclosure is not limited thereto. In some embodiments, when an acute angle is formed between the circuit board 13 and the axial direction B, the light-emitting direction of the plurality of light-emitting elements 14 is parallel to the circuit board 13. In some embodiments, the foregoing acute angle is an angle ranging from 10 degrees to 45 degrees. In some embodiments, the light-emitting direction of the light-emitting element 14 is not perpendicular to the inner wall 1151, to achieve the light effect in the form of indirect light.

Referring to FIG. 1 to FIG. 3A, in some embodiments, the light-emitting element 14 is a CSP LED (Chip scale package LED), and the light-emitting surface of the light-emitting element 14 that faces the inner light guide member 12 includes a reflective sheet, a light-shading sheet, or a diffusion sheet. In other words, the light-emitting surface of the light-emitting element 14 that is in the axial direction A and faces the inner light guide member 12 includes a reflective sheet, a light-shading sheet, or a diffusion sheet.

Referring to FIG. 1 to FIG. 3A, in some embodiments, there is no gap between the outer light guide member 11 and the inner light guide member 12, but this disclosure is not limited thereto. In some other embodiments, there is a gap between the outer light guide member 11 and the inner light guide member 12, and the gap is an air layer. The air layer (not shown in the figure) located at a boundary between the outer light guide member 11 and the inner light guide member 12 is the most natural light mixing medium.

Referring to FIG. 1 to FIG. 3A, in some embodiments, the outer light guide member 11 and the inner light guide member 12 can be made of polystyrene (PS), polycarbonate (PC), polymethyl methacrylate (PMMA), or other polymer materials. In some other embodiments, the outer light guide member 11 and the inner light guide member 12 may be made of a polyester film (PET film). In some other embodiments, the outer light guide member 11 and the inner light guide member 12 may be made of glass.

Referring to FIG. 1 to FIG. 3A, in some embodiments, auxiliary materials such as diffusing agent, diffusing powder, and toner can be added to the inner light guide member 12 and/or the outer light guide member 11.

Referring to FIG. 1 to FIG. 3A, in some embodiments, compared with the inner light guide member 12, a higher concentration of diffusing agent is added to the outer light guide member 11, so that a point light source can diffuse and form a uniform surface light source through the inner light guide member 12 and the outer light guide member 11, but this disclosure is not limited thereto. In some other embodiments, compared with the outer light guide member 11, a higher concentration of diffusing agent is added to the inner light guide member 12.

In some embodiments, the light bar module 1 further includes a cover body (not shown in the figure) located on an outer side of the outer light guide member 11.

Figure 6A:
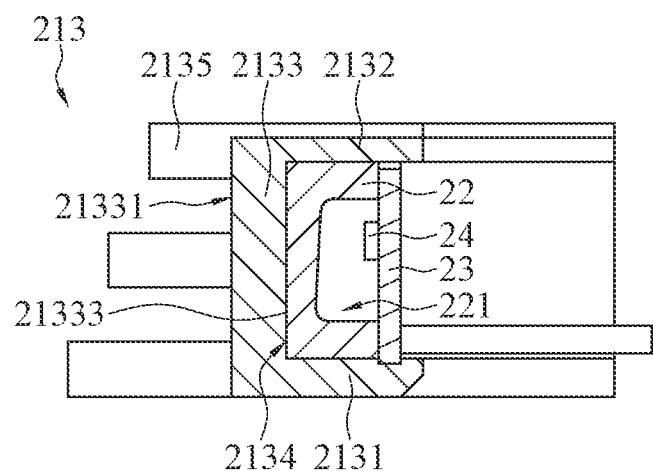
FIG. 6A is a side cross-sectional schematic diagram of a first light guide sub-member of a third embodiment of a light bar module.
Figure 6B:
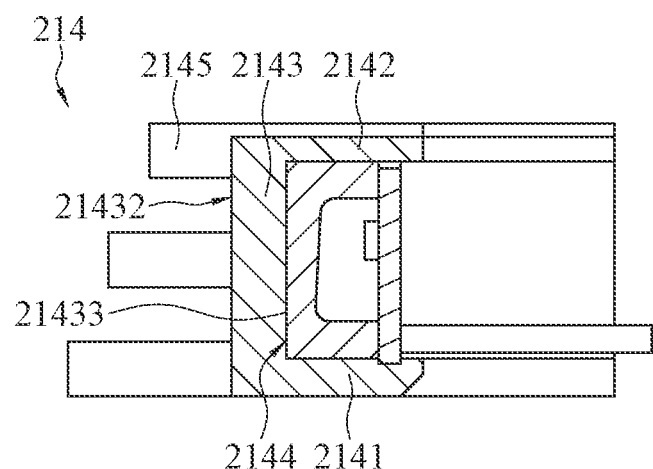
FIG. 6B is a side cross-sectional schematic diagram of a second light guide sub-member of a third embodiment of a light bar module.

Referring to FIG. 4 to FIG. 6B, FIG. 4 and FIG. 5 are front and rear three-dimensional exploded schematic diagrams respectively of a third embodiment of a light bar module, and FIG. 6A and FIG. 6B are side cross-sectional schematic diagrams of a first light guide sub-member 213 and a second light guide sub-member 214. The light bar module 2 includes an outer light guide member 21, an inner light guide member 22, a circuit board 23, and a plurality of light-emitting elements 24. The outer light guide member 21 is provided with a first accommodating space 212 and a light-emitting surface 211 on two sides respectively. The inner light guide member 22 is provided with a second accommodating space 221, and the inner light guide member 22 is accommodated in the first accommodating space 212. The circuit board 23 is accommodated in the first accommodating space 212. The circuit board 23 is located on an outer side of the inner light guide member 22 and is in contact with a side end surface of the inner light guide member 22. The plurality of light-emitting elements 24 are arranged on the circuit board 23 and accommodated in the second accommodating space 221, and are configured to emit light from the light-emitting surface 211.

Referring to FIG. 4 to FIG. 6B, in some embodiments, the outer light guide member 21 further includes a first light guide sub-member 213 and a second light guide sub-member 214 with a rectangular structure. The first light guide sub-member 213 is provided with a first sub-space 2134. The second light guide sub-member 214 is provided with a second sub-space 2144. The first light guide sub-member 213 and the second light guide sub-member 214 are arranged side by side in an axial direction of a long side, and the first sub-space 2134 and the second sub-space 2144 form the first accommodating space 212. By splitting the outer light guide member 21 into multiple pieces (for example, one or more first light guide sub-members 213 and one or more second light guide sub-members 214), the volume of the light bar module 2 is reduced, mold design and size control of injection molding are facilitated, and the difficulty of injection molding of a slender and large-sized optical plastic material and the amount of bending deformation of an injection-molded member are reduced.

Referring to FIG. 4 to FIG. 6B, in some embodiments, auxiliary materials such as diffusing agent, diffusing powder, and toner can be added to the inner light guide member 22, the first light guide sub-member 213, or the second light guide sub-member 214.

Referring to FIG. 6A and FIG. 6B, in some embodiments, the first light guide sub-member 213 includes a first horizontal side wall 2131, a second horizontal side wall 2132, and a first vertical side wall 2133. The first horizontal side wall 2131 and the second horizontal side wall 2132 are parallel to each other. The first vertical side wall 2133 is perpendicular to the first horizontal side wall 2131 and the second horizontal side wall 2132. The first vertical side wall 2133 connects to the first horizontal side wall 2131 and the second horizontal side wall 2132. In addition, the first horizontal side wall 2131, the second horizontal side wall 2132, and the first vertical side wall 2133 form the first sub-space 2134. The first vertical side wall 2133 further includes a first inner wall 21333 located in the first sub-space 2134, and the first inner wall 21333 is perpendicular to the first horizontal side wall 2131 and the second horizontal side wall 2132. The second light guide sub-member 214 includes a third horizontal side wall 2141, a fourth horizontal side wall 2142, and a second vertical side wall 2143. The third horizontal side wall 2141 and the first horizontal side wall 2131 are at the same height. The fourth horizontal side wall 2142 and the second horizontal side wall 2132 are at the same height. The second vertical side wall 2143 is perpendicular to the third horizontal side wall 2141 and the fourth horizontal side wall 2142. The second vertical side wall 2143 connects to the third horizontal side wall 2141 and the fourth horizontal side wall 2142. In addition, the third horizontal side wall 2141, the fourth horizontal side wall 2142, and the second vertical side wall 2143 form the second sub-space 2144. The second vertical side wall 2143 further includes a second inner wall 21433 located in the second sub-space 2144, and the second inner wall 21433 is perpendicular to the third horizontal side wall 2141 and the fourth horizontal side wall 2142. The first light guide sub-member 213 and the second light guide sub-member 214 are arranged side by side in an axial direction of a long side, and the first sub-space 2134 and the second sub-space 2144 form the first accommodating space 212. The first vertical side wall 2133 and the second vertical side wall 2143 form the light-emitting surface 211.

Referring to FIG. 6A and FIG. 6B, in some embodiments, the first light guide sub-member 213 further includes a plurality of light effect structures 2135 located on the light-emitting surface 211. In some other embodiments, the second light guide sub-member 214 further includes a plurality of light effect structures 2145 located on the light-emitting surface 211. In some other embodiments, spacing portions 21331 and 21432 between the plurality of light effect structures 2135 and 2145 further include a light-shading film. In the light bar module 2, various structures can be made on the light-emitting surface 211 of the first light guide sub-member 213 and the light-emitting surface 211 of the second light guide sub-member 214 to present different visual effects. In some embodiments, light is emitted from the light-emitting surface 211 and the plurality of light effect structures 2135 and 2145. In some other embodiments, since the spacing portions 21331 and 21432 between the plurality of light effect structures 2135 and 2145 include the light-shading film, light is emitted from the plurality of light effect structures 2135 and 2145. The spacing portions 21331 and 21432 are light-emitting surfaces 211 without the plurality of light effect structures 2135 and 2145.

Referring to FIG. 6A and FIG. 6B, in some embodiments, the plurality of light effect structures 2135 and 2145 are of different lengths. As shown in the cross-section of the light bar module 2 shown in FIG. 6A and FIG. 6B, a structural appearance of the light bar module 2 is roughly a right-angled trapezoid, and the light effect structures 2135 and 2145 are arranged in an inclined ladder shape. In some embodiments, lengths of the plurality of light effect structures 2135 and 2145 increase from a side close to the second horizontal side wall 2132 or the fourth horizontal side wall 2142 to a side close to the first horizontal side wall 2131 or the third horizontal side wall 2141, but this disclosure is not limited thereto. In some other embodiments, lengths of the plurality of light effect structures 2135 and 2145 decrease from a side close to the second horizontal side wall 2132 or the fourth horizontal side wall 2142 to a side close to the first horizontal side wall 2131 or the third horizontal side wall 2141.

Figure 7:
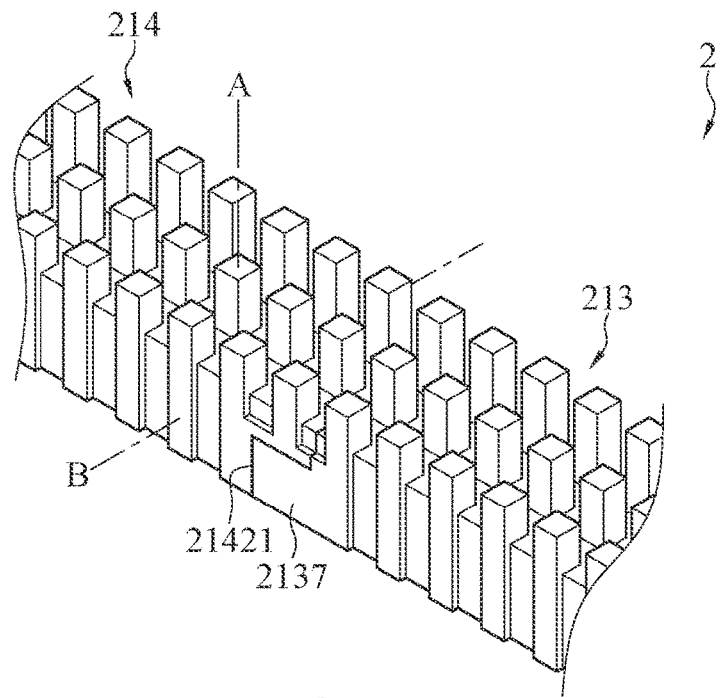
FIG. 7 is a partial three-dimensional schematic diagram of a third embodiment of a light bar module, where a first light guide sub-member and a second light guide sub-member are combined.
Figure 8:
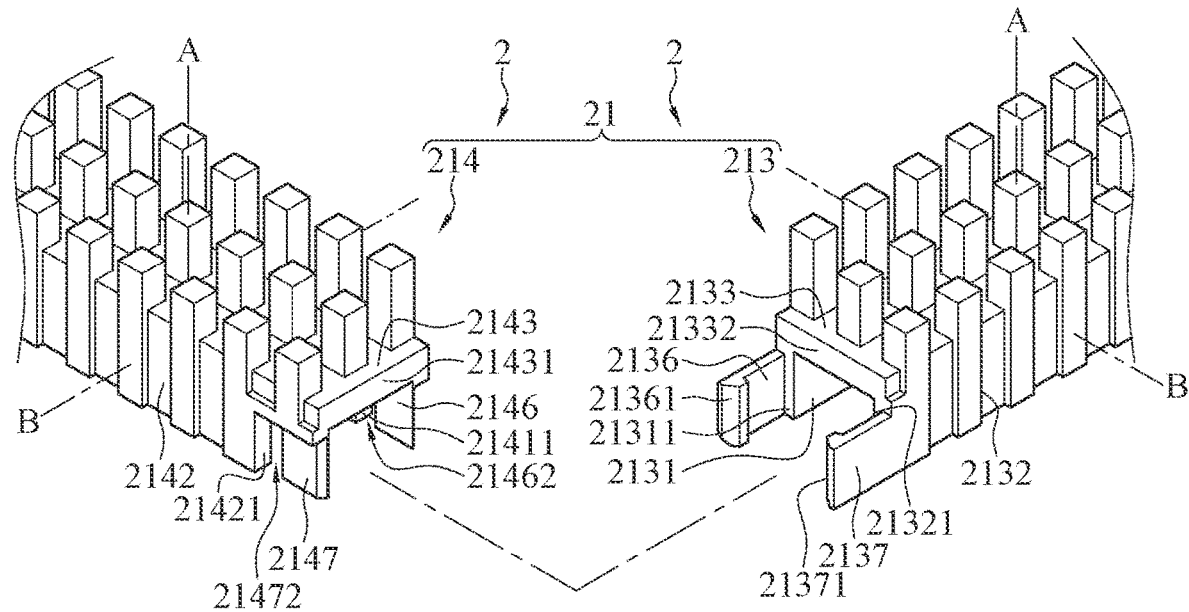
FIG. 8 is a partial three-dimensional exploded schematic diagram of a third embodiment of a light bar module, where a first light guide sub-member and a second light guide sub-member are separated.
Figure 9:
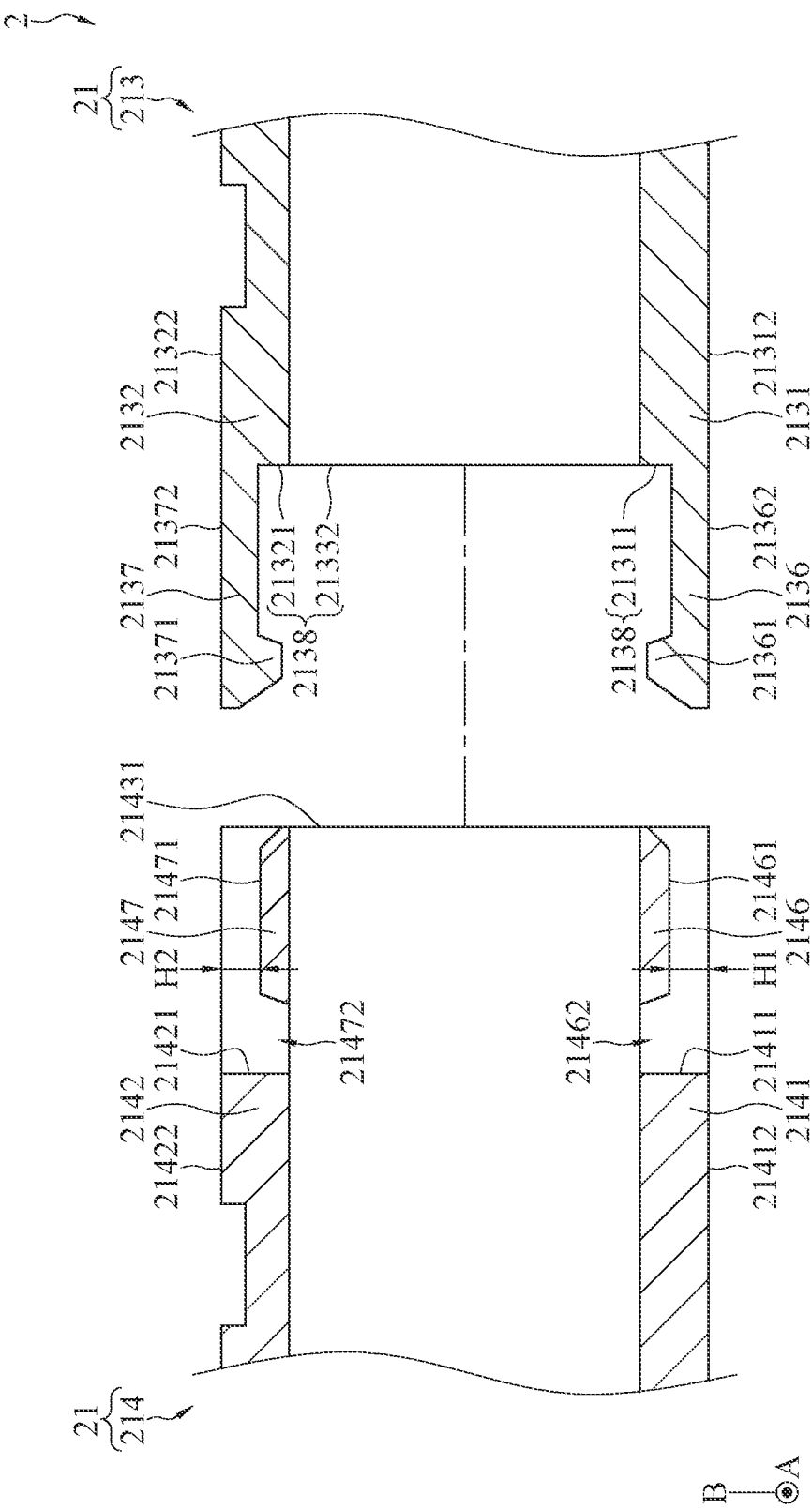
FIG. 9 is a partial side cross-sectional schematic diagram of an outer light guide member of a third embodiment of a light bar module, where a first light guide sub-member and a second light guide sub-member are separated.

Referring to FIG. 7 to FIG. 9, FIG. 7 and FIG. 8 are a partial three-dimensional schematic diagram and a partial three-dimensional exploded schematic diagram of a third embodiment of a light bar module 2, and FIG. 9 is a partial side cross-sectional schematic diagram of an outer light guide member 21. The first light guide sub-member 213 further includes a first fixation structure 2136 and a second fixation structure 2137. The first fixation structure 2136 extends from a first end portion 21311 of the first horizontal side wall 2131, and the second fixation structure 2137 extends from a second end portion 21321 of the second horizontal side wall 2132. The first light guide sub-member 213 corresponds to the second light guide sub-member 214 through the first fixation structure 2136 and the second fixation structure 2137.

Referring to FIG. 7 to FIG. 9, in some embodiments, the first fixation structure 2136 further includes a first bump 21361 protruding toward the second horizontal side wall 2132, and the second fixation structure 2137 further includes a second bump 21371 protruding toward the first horizontal side wall 2131. The second light guide sub-member 214 further includes a first elastic piece 2146 and a second elastic piece 2147 that are connected to the second vertical side wall 2143. A first concave portion 21462 is formed between the first elastic piece 2146 and a third end portion 21411 of the third horizontal side wall 2141 and is configured to accommodate the first bump 21361. A second concave portion 21472 is formed between the second elastic piece 2147 and a fourth end portion 21421 of the fourth horizontal side wall 2142 and is configured to accommodate the second bump 21371.

Referring to FIG. 9, in some embodiments, an outer surface 21362 of the first fixation structure 2136 is coplanar with an outer surface 21312 of the first horizontal side wall 2131, and an outer surface 21372 of the second fixation structure 2137 is coplanar with an outer surface 21322 of the second horizontal side wall 2132. There is a first height difference H1 between an outer surface 21412 of the third horizontal side wall 2141 and an outer surface 21461 of the first elastic piece 2146 in the axial direction B, and the first height difference H1 is greater than or equal to a thickness of the first fixation structure 2136 in the axial direction B. There is a second height difference H2 between an outer surface 21422 of the fourth horizontal side wall 2142 and an outer surface 21471 of the second elastic piece 2147 in the axial direction B, and the second height difference H2 is greater than or equal to a thickness of the second fixation structure 2137 in the axial direction B. In some embodiments, the first height difference H1 is the same as the second height difference H2, but this disclosure is not limited thereto. In some other embodiments, the first height difference H1 is different from the second height difference H2.

Referring to FIG. 9, in some embodiments, an axis perpendicular to the first inner wall 21333 and facing each of the light-emitting surface 211 and the circuit board 23 is defined as an axial direction A (that is, the first axial direction), and an axis connecting the first horizontal side wall 2131 to the second horizontal side wall 2132 is defined as an axial direction B (that is, the second axial direction). In addition, an axis perpendicular to the second inner wall 21433 and facing each of the light-emitting surface 211 and the circuit board 23 is also the axial direction A, and an axis connecting the third horizontal side wall 2141 to the fourth horizontal side wall 2142 is also the axial direction B. The axial direction A is perpendicular to the axial direction B. A projection position of the first end portion 21311 in the axial direction B is the same as a projection position of the second end portion 21321 in the axial direction B, and the first end portion 21311 and the second end portion 21321 are on a same horizontal plane. A projection position of the third end portion 21411 in the axial direction B is the same as a projection position of the fourth end portion 21421 in the axial direction B. A projection position of the first bump 21361 in the axial direction B is the same as a projection position of the second bump 21371 in the axial direction B. A projection position of the first elastic piece 2146 in the axial direction B is the same as a projection position of the second elastic piece 2147 in the axial direction B. The first elastic piece 2146 and the second elastic piece 2147 are planar structures arranged in parallel and side by side.

Referring to FIG. 9, a side end of the first vertical side wall 2133 is a portion facing the second light guide sub-member 214, and a side end of the second vertical side wall 2143 is a portion facing the first light guide sub-member 213. The side end of the first vertical side wall 2133 of the first light guide sub-member 213 further includes a vertical end portion 21332. The first end portion 21311, the second end portion 21321, and the vertical end portion 21332 form a first cross-section 2138. The first cross-section 2138 is in the axial direction A and is perpendicular to the first horizontal side wall 2131. In some embodiments, the first cross-section 2138 is further perpendicular to the light-emitting surface 211. In some embodiments, the first cross-section 2138 is further perpendicular to the circuit board 23.

In some embodiments, the side end of the second vertical side wall 2143 of the second light guide sub-member 214 further includes a second cross-section 21431. The second cross-section 21431 is in the axial direction A and is perpendicular to the third horizontal side wall 2141. In some embodiments, the second cross-section 21431 is further perpendicular to the light-emitting surface 211. In some embodiments, the second cross-section 21431 is further perpendicular to the circuit board 23.

Referring to FIG. 9, in some embodiments, the projection positions of the first end portion 21311 and the second end portion 21321 in the axial direction A overlap with the vertical end portion 21332. In some embodiments, the first end portion 21311, the second end portion 21321, and the vertical end portion 21332 are coplanar. In the light bar module, the cross-sections 2138 and 21431 at the side ends of the first light guide sub-member 213 and the second light guide sub-member 214 are perpendicular to the light-emitting surface 211, so that loss of light energy, cut-off of a light path, light leakage, or uncontrollable light refraction that affects an optical effect of the light bar module 2 can be avoided, and a continuous light source can be generated.

Figure 10:
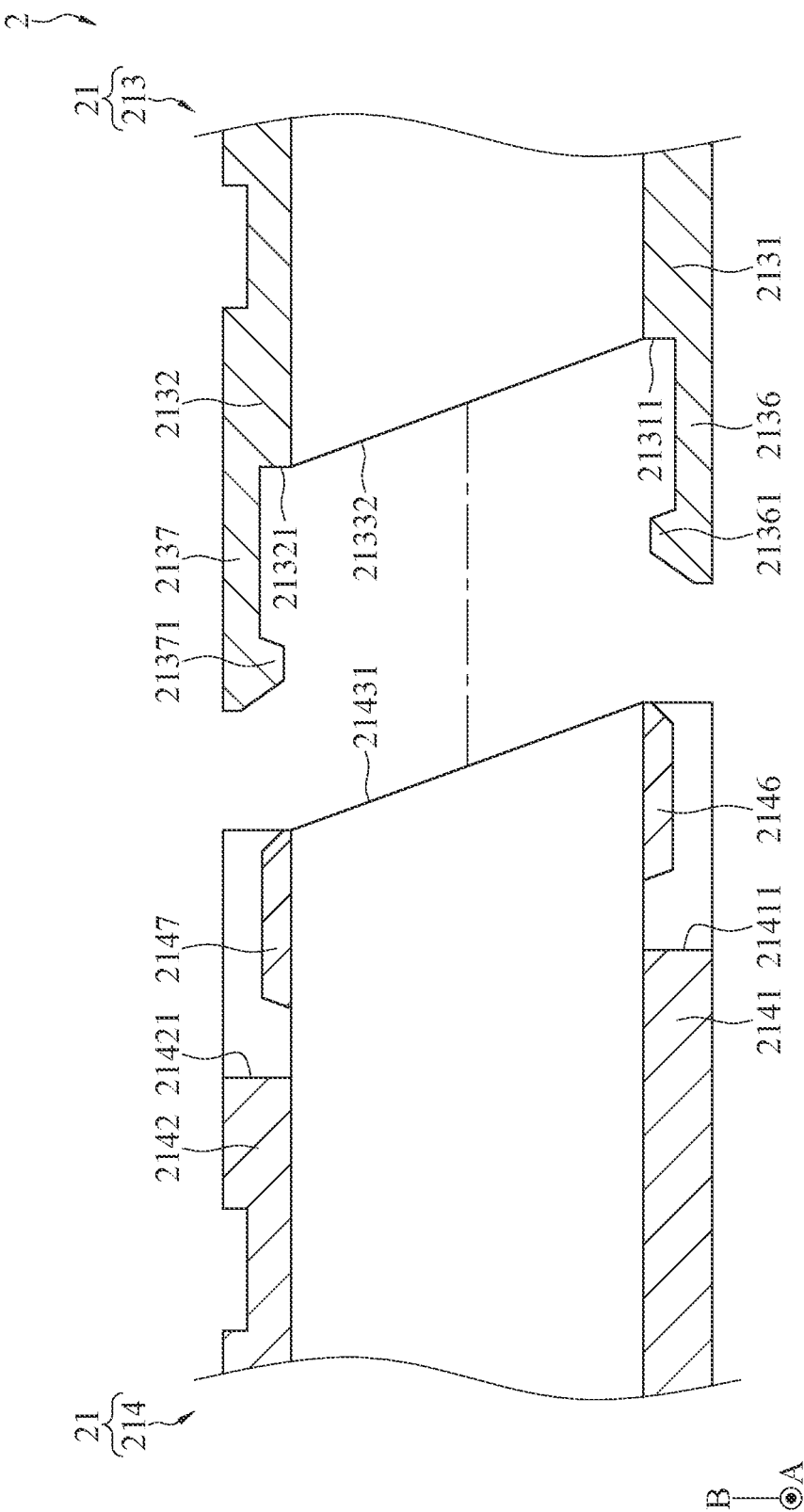
FIG. 10 is a partial side cross-sectional schematic diagram of an outer light guide member of a fourth embodiment of a light bar module, where a first light guide sub-member and a second light guide sub-member are separated.

Refer to FIG. 10, which is a partial side cross-sectional schematic diagram of an outer light guide member 21 of a fourth embodiment of a light bar module. A projection position of the first end portion 21311 in the axial direction B is different from a projection position of the second end portion 21321 in the axial direction B, and the first end portion 21311 and the second end portion 21321 are not on a same horizontal plane. In other words, the vertical end portion 21332 is a slope. A projection position of the third end portion 21411 in the axial direction B is different from a projection position of the fourth end portion 21421 in the axial direction B. A projection position of the first bump 21361 in the axial direction B is different from a projection position of the second bump 21371 in the axial direction B. A projection position of the first elastic piece 2146 in the axial direction B is different from a projection position of the second elastic piece 2147 in the axial direction B. The first elastic piece 2146 and the second elastic piece 2147 are planar structures arranged in parallel and side by side. In other words, the second cross-section 21431 is a slope.

Referring to FIG. 10, in some embodiments, the projection positions of the first end portion 21311 and the second end portion 21321 in the axial direction A overlap with the vertical end portion 21332. In some embodiments, the first end portion 21311, the second end portion 21321, and the vertical end portion 21332 are coplanar.

Figure 11:
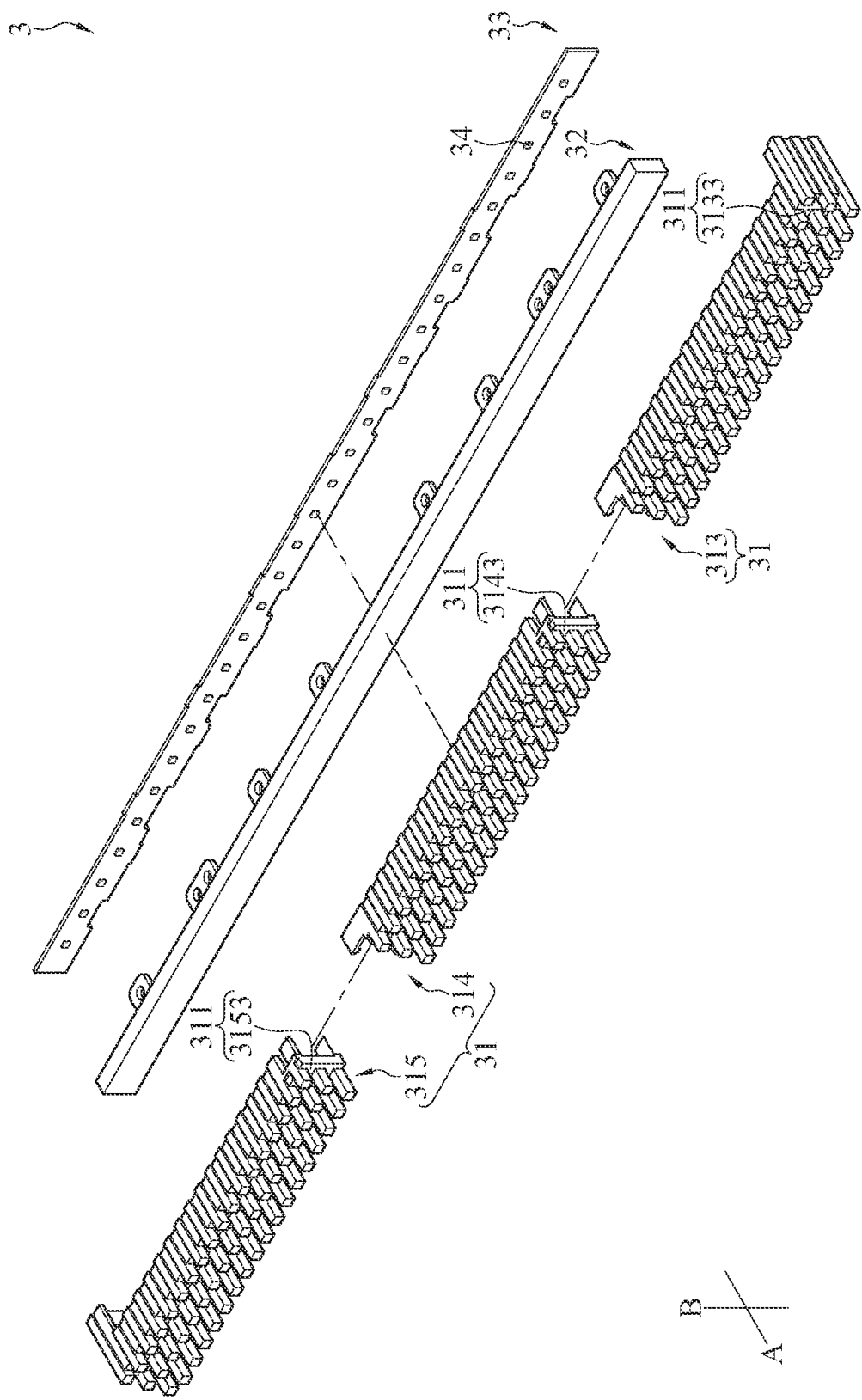
FIG. 11 is a front three-dimensional exploded schematic diagram of a fifth embodiment of a light bar module.
Figure 12:
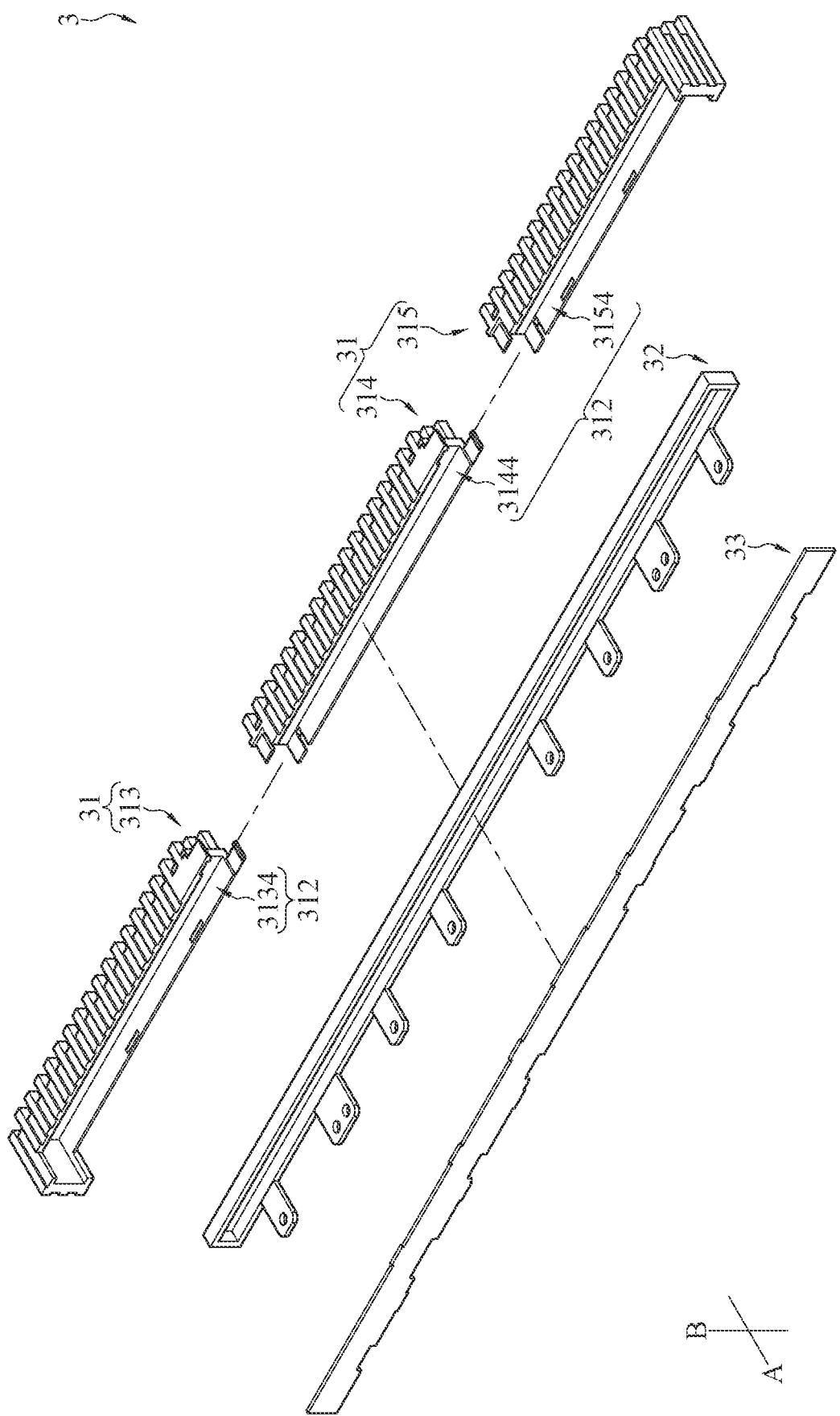
FIG. 12 is a rear three-dimensional exploded schematic diagram of a fifth embodiment of a light bar module.
Figure 13A:
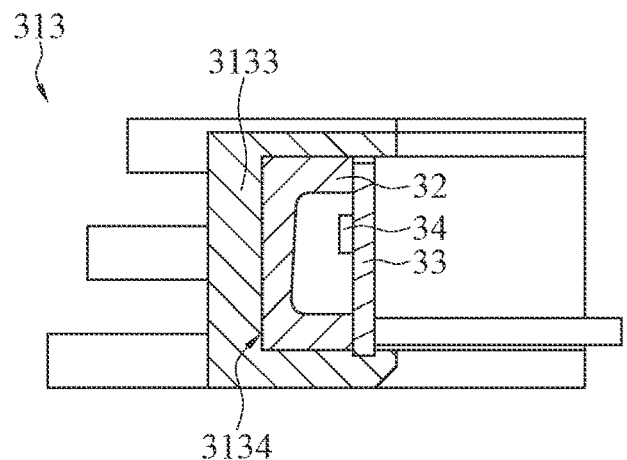
FIG. 13A is a side cross-sectional schematic diagram of a first light guide sub-member of a fifth embodiment of a light bar module.
Figure 13B:
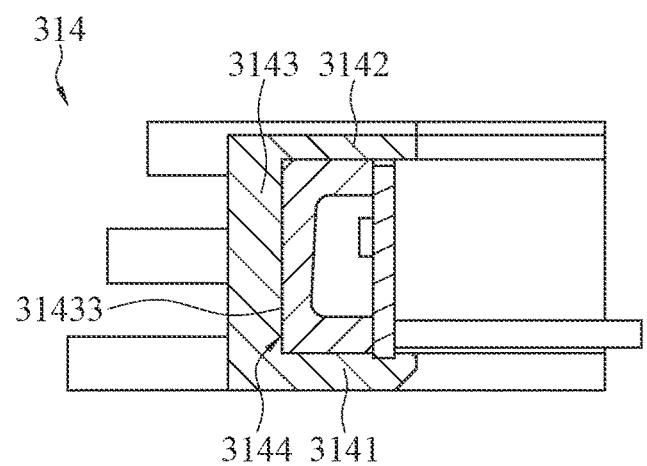
FIG. 13B is a side cross-sectional schematic diagram of a second light guide sub-member of a fifth embodiment of a light bar module.
Figure 13C:
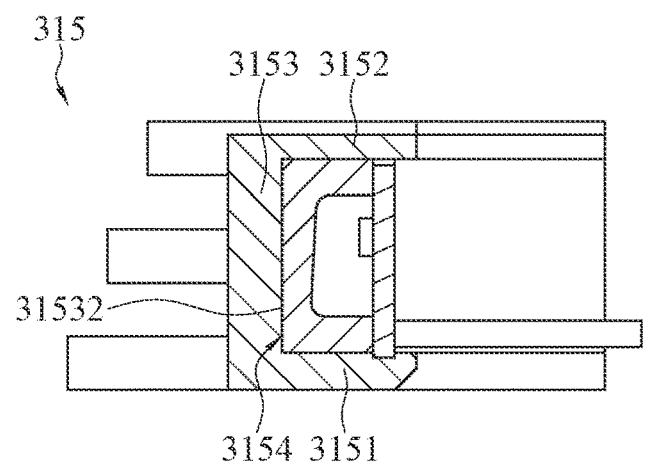
FIG. 13C is a side cross-sectional schematic diagram of a third light guide sub-member of a fifth embodiment of a light bar module.

Referring to FIG. 11 to FIG. 13C, FIG. 11 and FIG. 12 are front and rear three-dimensional exploded schematic diagrams of a fifth embodiment of a light bar module, and FIG. 13A to FIG. 13C are side cross-sectional schematic diagrams of a first light guide sub-member, a second light guide sub-member, and a third light guide sub-member. A structure of a light bar module 3 of the fifth embodiment is substantially the same as that of the third embodiment, and the only difference is that an outer light guide member 31 further includes a third light guide sub-member 315. In other words, the outer light guide member 31 of the light bar module 3 of the fifth embodiment includes a first light guide sub-member 313, a second light guide sub-member 314, and the third light guide sub-member 315. The first light guide sub-member 313 and the second light guide sub-member 314 of the fifth embodiment are the same as the first light guide sub-member 213 and the second light guide sub-member 214 of the light bar module 2 of the third embodiment. The first light guide sub-member 313 of the fifth embodiment is provided with a first sub-space 3134. The second light guide sub-member 314 is provided with a second sub-space 3144. The third light guide sub-member 315 is provided with a third sub-space 3154. The first light guide sub-member 313, the second light guide sub-member 314, and the third light guide sub-member 315 are arranged side by side in an axial direction of a long side, and the first sub-space 3134, the second sub-space 3144, and the third sub-space 3154 form the first accommodating space 312. By splitting the outer light guide member 31 into multiple pieces, the volume of the light bar module can be reduced and the mold design and size control of injection molding can be facilitated.

Referring to FIG. 11 and FIG. 12, in some embodiments, each of four end portions of the first light guide sub-member 313, the second light guide sub-member 314, or the third light guide sub-member 315 includes a fixation structure or an elastic piece. The elastic piece corresponds to the fixation structure. In some embodiments, each of four end portions of the second light guide sub-member 314 includes a fixation structure, each of two end portions of the first light guide sub-member 313 corresponding to the second light guide sub-member 314 includes an elastic piece, and each of two end portions of the third light guide sub-member 315 corresponding to the second light guide sub-member 314 includes an elastic piece. In some other embodiments, each of four end portions of the second light guide sub-member 314 includes an elastic piece, each of two end portions of the first light guide sub-member 313 corresponding to the second light guide sub-member 314 includes a fixation structure, and each of two end portions of the third light guide sub-member 315 corresponding to the second light guide sub-member 314 includes a fixation structure. In some other embodiments, two end portions of the second light guide sub-member 314 corresponding to the first light guide sub-member 313 each include a fixation structure and an elastic piece respectively, two end portions of the first light guide sub-member 313 corresponding to the second light guide sub-member 314 each include an elastic piece and a fixation structure respectively, and the elastic piece corresponds to the fixation structure. In addition, two end portions of the second light guide sub-member 314 corresponding to the third light guide sub-member 315 each include a fixation structure and an elastic piece respectively, two end portions of the third light guide sub-member 315 corresponding to the second light guide sub-member 314 each include an elastic piece and a fixation structure respectively, and the elastic piece corresponds to the fixation structure.

Referring to FIG. 13C, in some embodiments, the third light guide sub-member 315 includes a fifth horizontal side wall 3151, a sixth horizontal side wall 3152, and a third vertical side wall 3153. The fifth horizontal side wall 3151 and the third horizontal side wall 3141 are at the same height. The sixth horizontal side wall 3152 and the fourth horizontal side wall 3142 are at the same height. The third vertical side wall 3153 is perpendicular to the fifth horizontal side wall 3151 and the sixth horizontal side wall 3152. The third vertical side wall 3153 connects to the fifth horizontal side wall 3151 and the sixth horizontal side wall 3152. In addition, the fifth horizontal side wall 3151, the sixth horizontal side wall 3152, and the third vertical side wall 3153 form the third sub-space 3154. The third vertical side wall 3153 further includes a third inner wall 31532 located in the third sub-space 3154, and the third inner wall 31532 is perpendicular to the fifth horizontal side wall 3151 and the sixth horizontal side wall 3152. The first light guide sub-member 313, the second light guide sub-member 314, and the third light guide sub-member 315 are arranged side by side in an axial direction of a long side, and the first sub-space 3134, the second sub-space 3144, and the third sub-space 3154 form the first accommodating space 312. The first vertical side wall 3133, the second vertical side wall 3143, and the third vertical side wall 3153 form the light-emitting surface 311.

Figure 14:
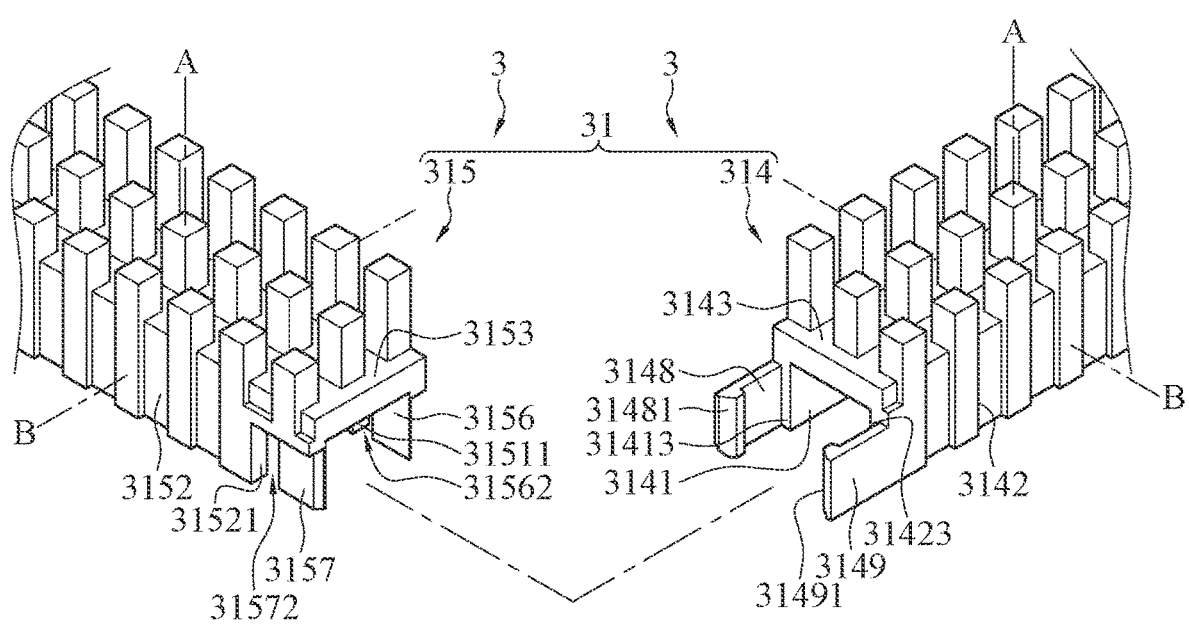
FIG. 14 is a partial three-dimensional exploded schematic diagram of a fifth embodiment of a light bar module, where a second light guide sub-member and a third light guide sub-member are separated.
Figure 15:
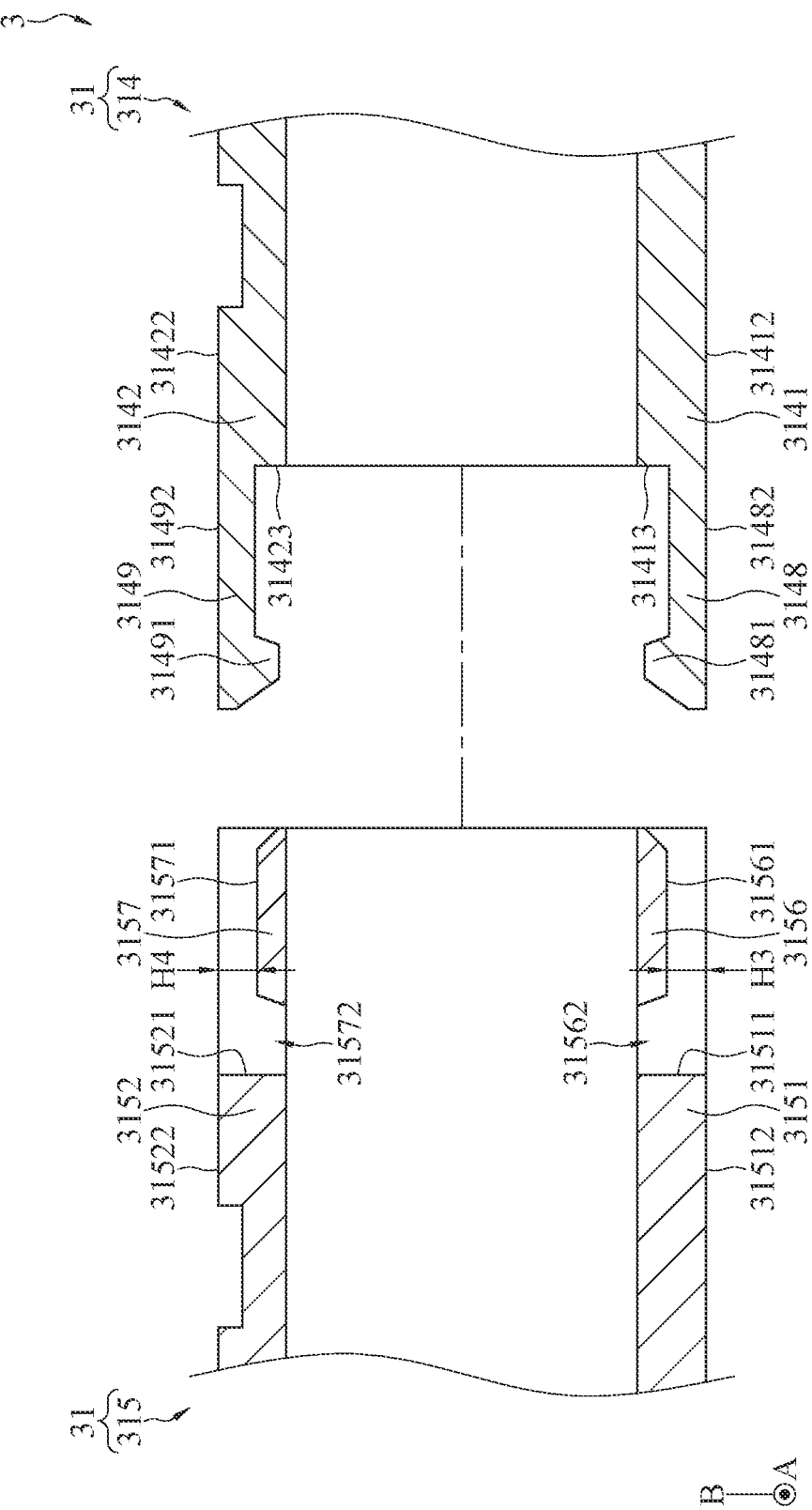
FIG. 15 is a partial side cross-sectional schematic diagram of an outer light guide member of a fifth embodiment of a light bar module, where a second light guide sub-member and a third light guide sub-member are separated.

Refer to FIG. 14 and FIG. 15, which are a partial three-dimensional exploded schematic diagram of a fifth embodiment of a light bar module and a partial side cross-sectional schematic diagram of an outer light guide member. The second light guide sub-member 314 further includes a third fixation structure 3148 and a fourth fixation structure 3149. The third fixation structure 3148 extends from a fifth end portion 31413 of the third horizontal side wall 3141, and the fourth fixation structure 3149 extends from a sixth end portion 31423 of the fourth horizontal side wall 3142. The second light guide sub-member 314 corresponds to the third light guide sub-member 315 through the third fixation structure 3148 and the fourth fixation structure 3149.

Referring to FIG. 14 and FIG. 15, in some embodiments, the third fixation structure 3148 further includes a third bump 31481 protruding toward the fourth horizontal side wall 3142, and the fourth fixation structure 3149 further includes a fourth bump 31491 protruding toward the third horizontal side wall 3141. The third light guide sub-member 315 further includes a third elastic piece 3156 and a fourth elastic piece 3157 that are connected to the third vertical side wall 3153. A third concave portion 31562 is formed between the third elastic piece 3156 and a seventh end portion 31511 of the fifth horizontal side wall 3151 and is configured to accommodate the third bump 31481. A fourth concave portion 31572 is formed between the fourth elastic piece 3157 and an eighth end portion 31521 of the sixth horizontal side wall 3152 and is configured to accommodate the fourth bump 31491.

Referring to FIG. 14 and FIG. 15, in some embodiments, an outer surface 31482 of the third fixation structure 3148 is coplanar with an outer surface 31412 of the third horizontal side wall 3141, and an outer surface 31492 of the fourth fixation structure 3149 is coplanar with an outer surface 31422 of the fourth horizontal side wall 3142. There is a third height difference H3 between an outer surface 31512 of the fifth horizontal side wall 3151 and an outer surface 31561 of the third elastic piece 3156 in the axial direction B, and the third height difference H3 is greater than or equal to a thickness of the third fixation structure 3148 in the axial direction B. There is a fourth height difference H4 between an outer surface 31522 of the sixth horizontal side wall 3152 and an outer surface 31571 of the fourth elastic piece 3157 in the axial direction B, and the fourth height difference H4 is greater than or equal to a thickness of the fourth fixation structure 3149 in the axial direction B. In some embodiments, the third height difference H3 is the same as the fourth height difference H4. In some other embodiments, the third height difference H3 is different from the fourth height difference H4.

Referring to FIG. 15, in some embodiments, an axis perpendicular to the third inner wall 31532 and facing each of the light-emitting surface 311 and the circuit board 33 is defined as an axial direction A (that is, the first axial direction), and an axis connecting the fifth horizontal side wall 3151 to the sixth horizontal side wall 3152 is defined as an axial direction B (that is, the second axial direction). In addition, an axis perpendicular to the second inner wall 31433 and facing each of the light-emitting surface 311 and the circuit board 33 is also the axial direction A, and an axis connecting the third horizontal side wall 3141 to the fourth horizontal side wall 3142 is also the axial direction B. The axial direction A is perpendicular to the axial direction B. A projection position of the fifth end portion 31413 in the axial direction B is the same as a projection position of the sixth end portion 31423 in the axial direction B, and the fifth end portion 31413 and the sixth end portion 31423 are on a same horizontal plane. A projection position of the seventh end portion 31511 in the axial direction B is the same as a projection position of the eighth end portion 31521 in the axial direction B. A projection position of the third bump 31481 in the axial direction B is the same as a projection position of the fourth bump 31491 in the axial direction B. A projection position of the third elastic piece 3156 in the axial direction B is the same as a projection position of the fourth elastic piece 3157 in the axial direction B. The third elastic piece 3156 and the fourth elastic piece 3157 are planar structures arranged in parallel and side by side.

Figure 16:
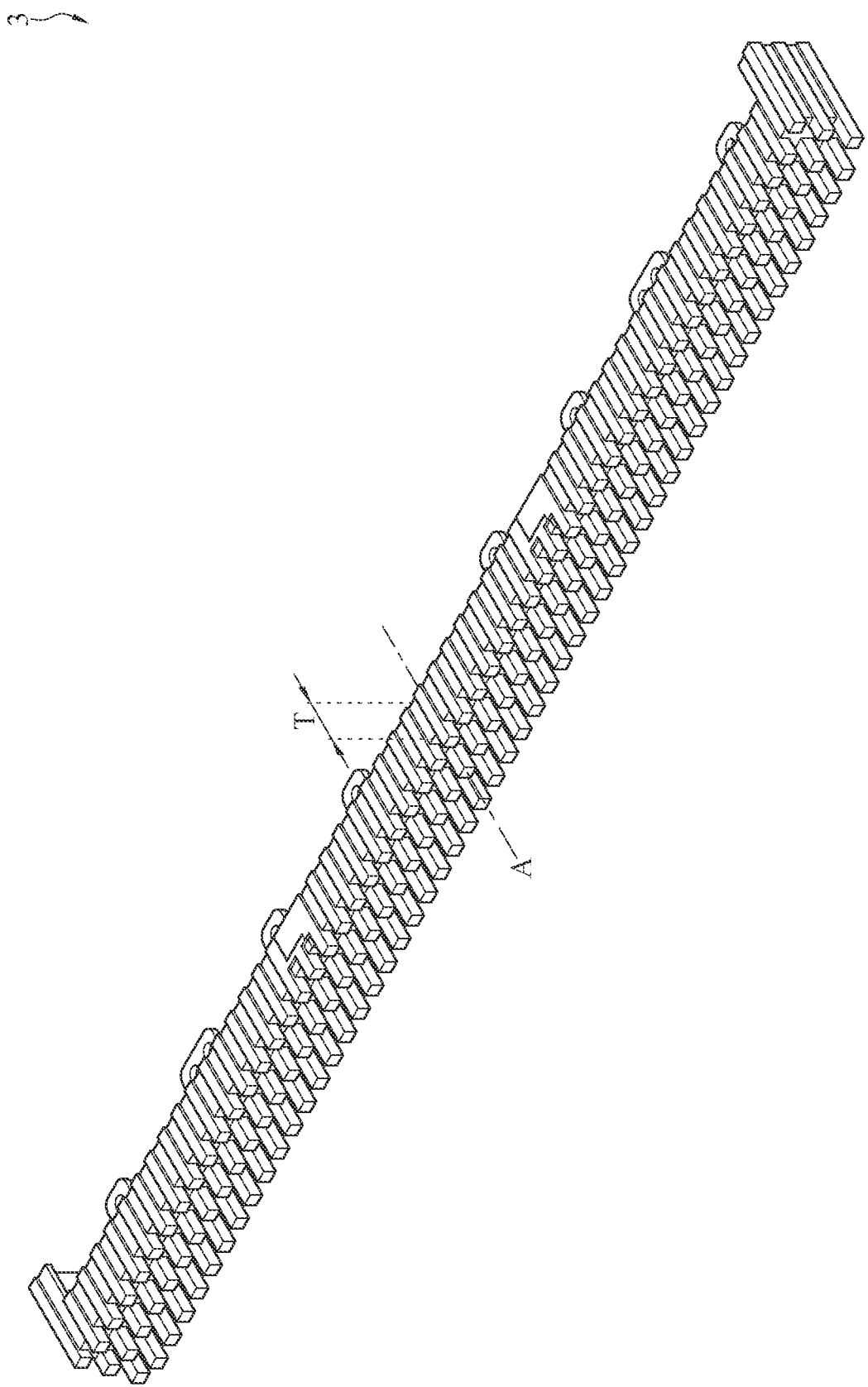
FIG. 16 is a three-dimensional schematic diagram of a fifth embodiment of a light bar module, where a first light guide sub-member, a second light guide sub-member, and a third light guide sub-member are combined.

Refer to FIG. 16, which is a three-dimensional schematic diagram of a fifth embodiment of a light bar module. A thickness T of the outer light guide member 31 and the inner light guide member 32 in the axial direction A (the definition of the axial direction A is the same as that described in the previous paragraphs) is less than 4.5 millimeters. In some other embodiments, the thickness T of the outer light guide member 31 and the inner light guide member 32 in the axial direction A ranges from 3.5 millimeters to 4.5 millimeters. In some other embodiments, the thickness T of the outer light guide member 31 and the inner light guide member 32 in the axial direction A is 3.7 millimeters, 4.0 millimeters, or 4.2 millimeters.

Figure 17:
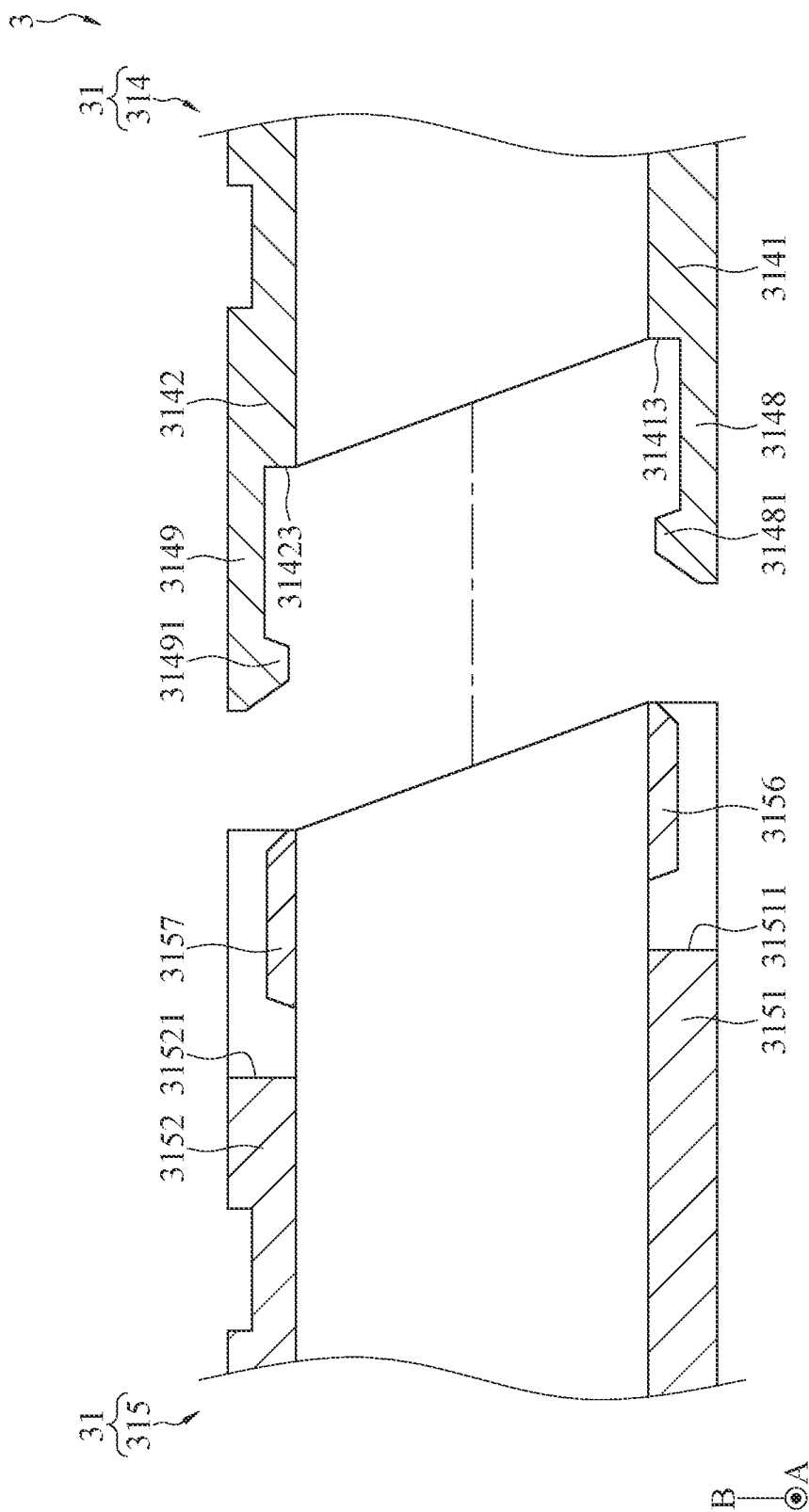
FIG. 17 is a partial side cross-sectional schematic diagram of an outer light guide member of a sixth embodiment of a light bar module, where a second light guide sub-member and a third light guide sub-member are separated.

Refer to FIG. 17, which is a partial side cross-sectional schematic diagram of an outer light guide member 31 of a sixth embodiment of a light bar module. A projection position of the fifth end portion 31413 in the axial direction B is different from a projection position of the sixth end portion 31423 in the axial direction B, and the fifth end portion 31413 and the sixth end portion 31423 are not on a same horizontal plane. A projection position of the seventh end portion 31511 in the axial direction B is different from a projection position of the eighth end portion 31521 in the axial direction B. A projection position of the third bump 31481 in the axial direction B is different from a projection position of the fourth bump 31491 in the axial direction B. A projection position of the third elastic piece 3156 in the axial direction B is different from a projection position of the fourth elastic piece 3157 in the axial direction B. The third elastic piece 3156 and the fourth elastic piece 3157 are planar structures arranged in parallel and side by side.

Figure 18:
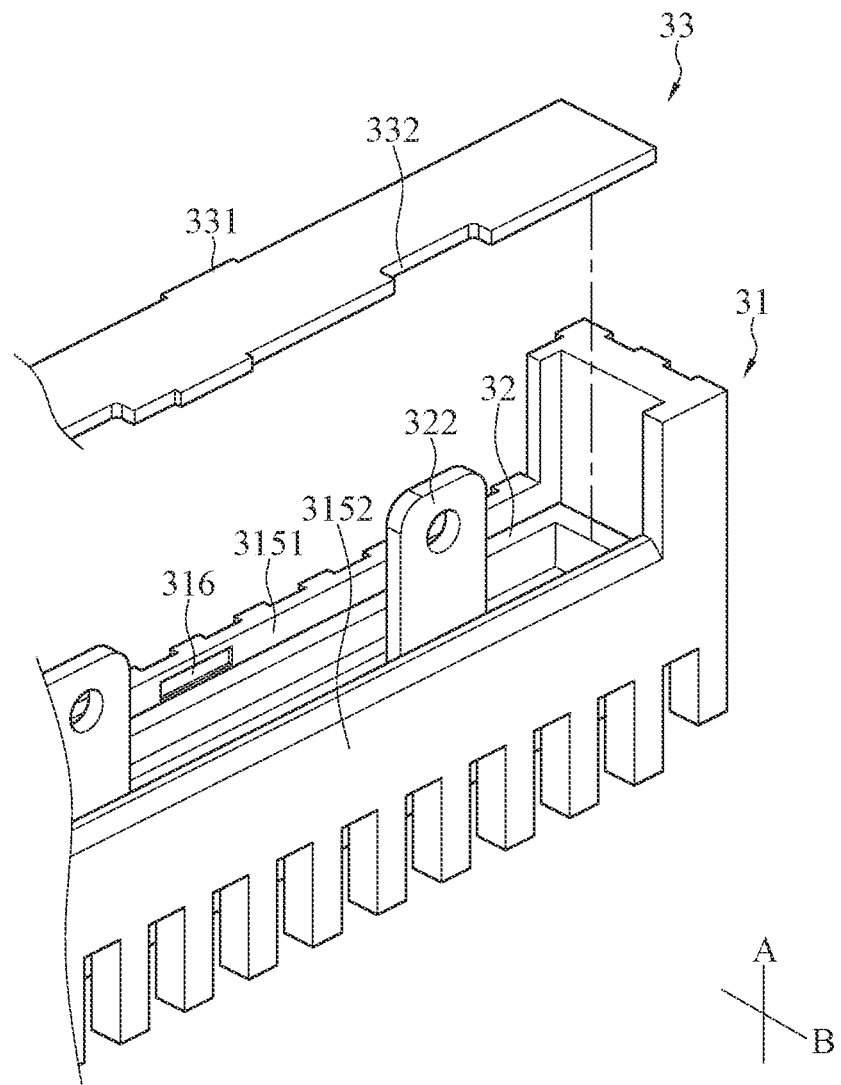
FIG. 18 is a partial three-dimensional exploded schematic diagram of a seventh embodiment of a light bar module.

Refer to FIG. 18, which is a partial three-dimensional exploded schematic diagram of a seventh embodiment of a light bar module. The outer light guide member 31 includes a plurality of first grooves 316 (FIG. 18 shows one first groove 316, and a plurality of first grooves 316 can be seen from FIG. 12), the inner light guide member 32 includes a plurality of protruding structures 322, and the circuit board 33 includes a plurality of protruding portions 331 and a plurality of second grooves 332. The protruding structure 322 is a structure protruding toward the circuit board 33 in the axial direction A (the definition of the axial direction A is the same as that described in the previous paragraphs). The protruding portion 331 is a structure protruding toward the outer light guide member 31 in the axial direction B (the definition of the axial direction B is the same as that described in the previous paragraphs). Each of the protruding portions 331 is locked in each of the first grooves 316 respectively, and each of the protruding structures 322 is locked in each of the second grooves 332 respectively.

Figure 19A:
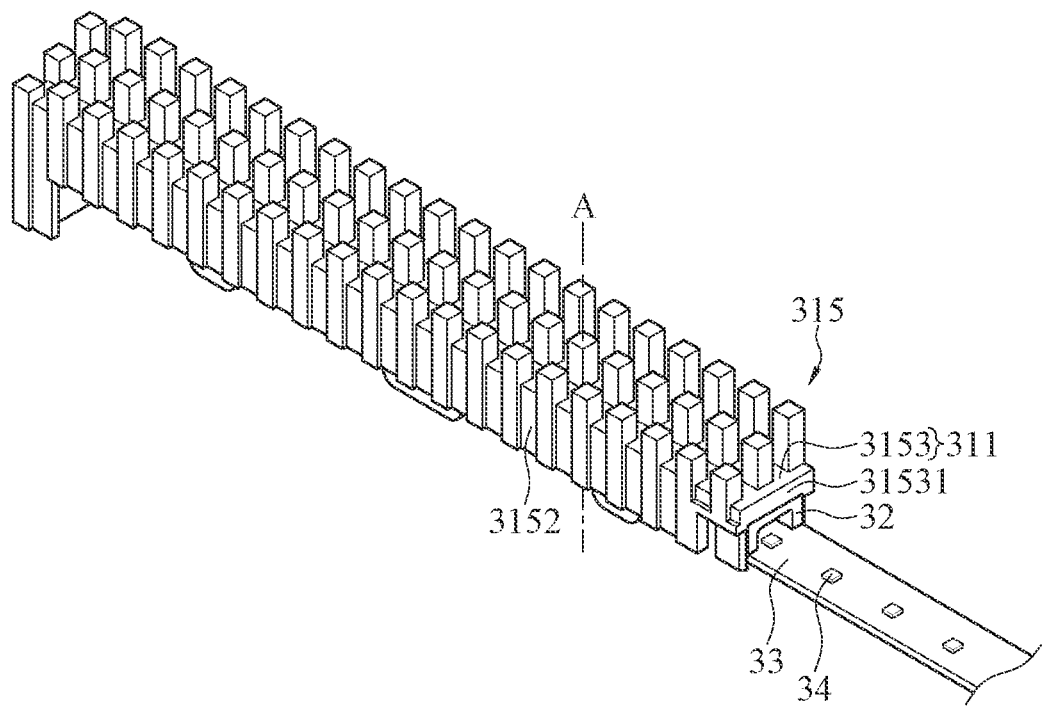
FIG. 19A is a partial three-dimensional schematic diagram of an eighth embodiment of a light bar module, where a third light guide sub-member is combined with an inner light guide member and a circuit board, and a light-emitting element corresponds to a position of a third cross-section in an axial direction A.
Figure 19B:
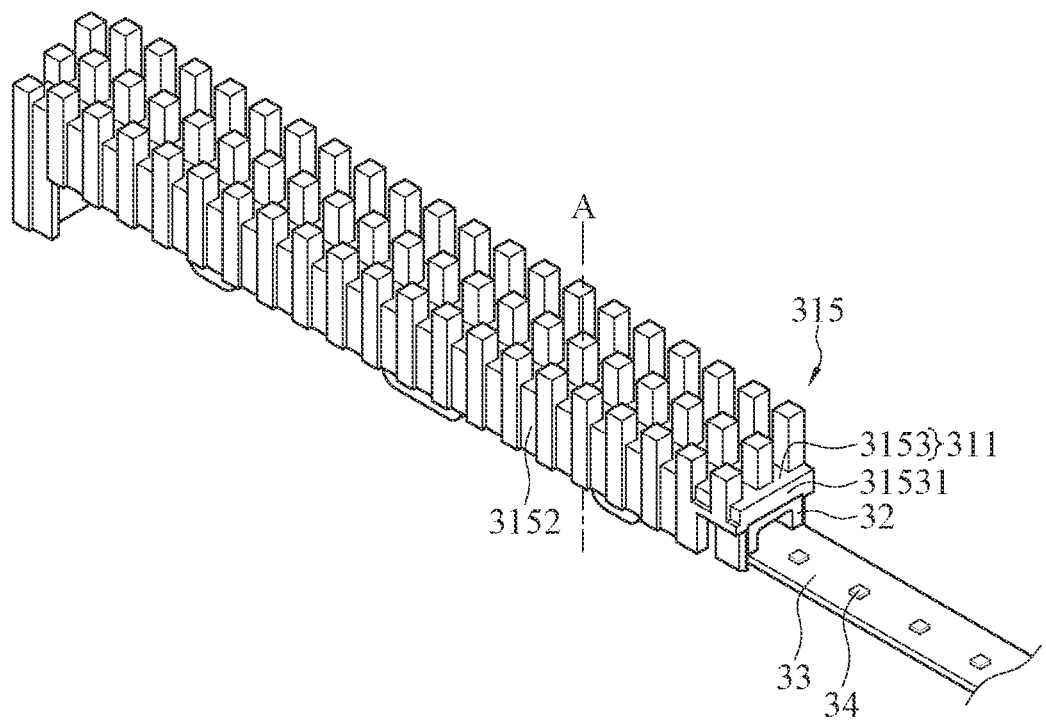
FIG. 19B is a partial three-dimensional schematic diagram of a ninth embodiment of a light bar module, where a third light guide sub-member is combined with an inner light guide member and a circuit board, and a light-emitting element is offset from a position of a third cross-section in an axial direction A.

Refer to FIG. 19A and FIG. 19B, which are a partial three-dimensional schematic diagram of an eighth embodiment and a ninth embodiment of a light bar module. A side end of the third vertical side wall 3153 is a portion facing the second light guide sub-member 314. The side end of the third vertical side wall 3153 of the third light guide sub-member 315 further includes a third cross-section 31531. The third cross-section 31531 is in the axial direction A and is perpendicular to the sixth horizontal side wall 3152. In some embodiments, the third cross-section 31531 is further perpendicular to the light-emitting surface 311. In some embodiments, the third cross-section 31531 is further perpendicular to the circuit board 33. In some embodiments, the third cross-section 31531 of the third light guide sub-member 315 is designed to be parallel to a traveling direction of light.

In some embodiments, as shown in FIG. 19A, the light-emitting element 34 is arranged on the circuit board 33, and the projection position of the light-emitting element 34 in the axial direction A is the same as the projection position of the third cross-section 31531 in the axial direction A. In some other embodiments, as shown in FIG. 19B, the light-emitting element 34 is arranged on the circuit board 33, and the projection position of the light-emitting element 34 in the axial direction A is different from the projection position of the third cross-section 31531 in the axial direction A.

Therefore, according to some embodiments, in the light bar module, through an outer light guide member and an inner light guide member, a mechanism thickness or size of the optical plastic material required to mix light or eliminate hotspots can be reduced, so that generation of the hotspots can still be effectively avoided when a mechanism space of the light bar module is insufficient. According to some embodiments, in the light bar module, the difficulty of injection molding of a slender and large-sized optical plastic material and the amount of bending deformation of an injection-molded member can be reduced through a multiple-piece outer light guide member. In addition, various structures can be made on the light-emitting surface of the outer light guide member. According to some embodiments, the light bar module achieves light diffusion by continuously refracting or reflecting light at an interface between the outer light guide member and the inner light guide member to uniformize an intensity of the light-emitting surface. An air layer located at a boundary between the outer light guide member and the inner light guide member is the most natural light mixing medium. According to some embodiments, if diffusing powder needs to be added to the optical plastic material, it can be added only to the outer light guide member or the inner light guide member, or it can be added to only one of or part of the outer light guide member to effectively eliminate the hotspots, maintain brightness, and reduce the mechanism space. According to some embodiments, in the light bar module, the cross-section at the side end of the outer light guide member is perpendicular to the light-emitting surface, so that loss of light energy, cut-off of a light path, light leakage, or uncontrollable light refraction that affects an optical effect of the light bar module can be avoided, and a continuous light source can be generated.

What is claimed is:

1. A light bar module, comprising:
    an outer light guide member, provided with a first accommodating space and a light-emitting surface on two sides respectively;
    an inner light guide member, provided with a second accommodating space, the inner light guide member being accommodated in the first accommodating space; and
    a circuit board, provided with a plurality of light-emitting elements, each of the light-emitting elements being accommodated in the second accommodating space and being configured to emit light from the light-emitting surface;
    wherein the outer light guide member comprises a left horizontal side wall, a right horizontal side wall, and a vertical side wall, the left horizontal side wall and the right horizontal side wall are parallel to each other, the vertical side wall is perpendicular to the left horizontal side wall and the right horizontal side wall, the vertical side wall comprises an inner wall, the inner wall is perpendicular to the left horizontal side wall and the right horizontal side wall, the vertical side wall connects to the left horizontal side wall and the right horizontal side wall, an axis perpendicular to the inner wall is defined as a first axial direction, an axis perpendicular to the left horizontal side wall or the right horizontal side wall is defined as a second axial direction, the first axial direction is perpendicular to the second axial direction, the circuit board is parallel to the second axial direction, and a light-emitting direction of each of the light-emitting elements is parallel to the circuit board.

2. The light bar module according to claim 1, wherein the outer light guide member comprises:
    a first light guide sub-member, provided with a first sub-space; and
    a second light guide sub-member, provided with a second sub-space, the first light guide sub-member and the second light guide sub-member being arranged side by side, and the first sub-space and the second sub-space forming the first accommodating space.

3. The light bar module according to claim 2, wherein the outer light guide member further comprises:
    a third light guide sub-member, provided with a third sub-space, the first light guide sub-member, the second light guide sub-member, and the third light guide sub-member being arranged side by side in sequence, and the first sub-space, the second sub-space, and the third sub-space forming the first accommodating space.

4. The light bar module according to claim 2, wherein a first cross-section at a side end of the first light guide sub-member is perpendicular to the light-emitting surface, and a second cross-section at a side end of the second light guide sub-member is perpendicular to the light-emitting surface.

5. The light bar module according to claim 1, wherein the outer light guide member is provided with a plurality of light effect structures located on the light-emitting surface.

6. The light bar module according to claim 1, wherein thicknesses of the outer light guide member and the inner light guide member in the first axial direction are less than 4.5 millimeters.

7. The light bar module according to claim 1, wherein the outer light guide member is provided with a plurality of first grooves, the inner light guide member is provided with a plurality of protruding structures, the circuit board is provided with a plurality of protruding portions and a plurality of second grooves, each of the protruding portions is locked in each of the first grooves respectively, and each of the protruding structures is locked in each of the second grooves respectively.

8. The light bar module according to claim 1, wherein the outer light guide member comprises:
- a first light guide sub-member, comprising:
  - a first horizontal side wall;
  - a second horizontal side wall, parallel to the first horizontal side wall; and
  - a first vertical side wall, perpendicular to the first horizontal side wall and the second horizontal side wall, the first vertical side wall comprising a first inner wall, the first inner wall being perpendicular to the first horizontal side wall and the second horizontal side wall, the first vertical side wall connecting to the first horizontal side wall and the second horizontal side wall, and the first horizontal side wall, the second horizontal side wall, and the first vertical side wall forming a first sub-space;
- a second light guide sub-member, comprising:
  - a third horizontal side wall, at a same height as the first horizontal side wall;
  - a fourth horizontal side wall, at a same height as the second horizontal side wall; and
  - a second vertical side wall, perpendicular to the third horizontal side wall and the fourth horizontal side wall, the second vertical side wall comprising a second inner wall, the second inner wall being perpendicular to the third horizontal side wall and the fourth horizontal side wall, the second vertical side wall connecting to the third horizontal side wall and the fourth horizontal side wall, and the third horizontal side wall, the fourth horizontal side wall, and the second vertical side wall forming a second sub-space; and
- a third light guide sub-member, comprising:
  - a fifth horizontal side wall, at a same height as the third horizontal side wall;
  - a sixth horizontal side wall, at a same height as the fourth horizontal side wall; and
  - a third vertical side wall, perpendicular to the fifth horizontal side wall and the sixth horizontal side wall, the third vertical side wall comprising a third inner wall, the third inner wall being perpendicular to the fifth horizontal side wall and the sixth horizontal side wall, the third vertical side wall connecting to the fifth horizontal side wall and the sixth horizontal side wall, and the fifth horizontal side wall, the sixth horizontal side wall, and the third vertical side wall forming a third sub-space, wherein
- the first light guide sub-member, the second light guide sub-member, and the third light guide sub-member are arranged side by side in sequence, the first sub-space, the second sub-space, and the third sub-space form the first accommodating space, and the light-emitting surface comprises the first vertical side wall, the second vertical side wall, and the third vertical side wall;
- the outer light guide member is provided with a plurality of light effect structures located on the light-emitting surface;
- an axis perpendicular to the first inner wall is defined as a first axial direction, an axis connecting the first horizontal side wall to the second horizontal side wall is defined as a second axial direction, and the first axial direction is perpendicular to the second axial direction;
- a light-emitting direction of each of the light-emitting elements is the second axial direction;
- the first light guide sub-member is provided with a first fixation structure extending from a first end portion of the first horizontal side wall and a second fixation structure extending from a second end portion of the second horizontal side wall, and the first light guide sub-member corresponds to the second light guide sub-member through the first fixation structure and the second fixation structure; the second light guide sub-member is provided with a third fixation structure extending from a fifth end portion of the third horizontal side wall and a fourth fixation structure extending from a sixth end portion of the fourth horizontal side wall, and the second light guide sub-member corresponds to the third light guide sub-member through the third fixation structure and the fourth fixation structure;
- the first fixation structure is provided with a first bump protruding toward the second horizontal side wall, the second fixation structure is provided with a second bump protruding toward the first horizontal side wall, the third fixation structure is provided with a third bump protruding toward the fourth horizontal side wall, and the fourth fixation structure is provided with a fourth bump protruding toward the third horizontal side wall;
- the second light guide sub-member further comprises a first elastic piece and a second elastic piece that are connected to the second vertical side wall, and a first concave portion is formed between the first elastic piece and a third end portion of the third horizontal side wall and is configured to accommodate the first bump; and a second concave portion is formed between the second elastic piece and a fourth end portion of the fourth horizontal side wall and is configured to accommodate the second bump; the third light guide sub-member further comprises a third elastic piece and a fourth elastic piece that are connected to the third vertical side wall, and a third concave portion is formed between the third elastic piece and a seventh end portion of the fifth horizontal side wall and is configured to accommodate the third bump; and a fourth concave portion is formed between the fourth elastic piece and an eighth end portion of the sixth horizontal side wall and is configured to accommodate the fourth bump;
- an outer surface of the first fixation structure is coplanar with an outer surface of the first horizontal side wall, and an outer surface of the second fixation structure is coplanar with an outer surface of the second horizontal side wall; an outer surface of the third fixation structure is coplanar with an outer surface of the third horizontal side wall, and an outer surface of the fourth fixation structure is coplanar with an outer surface of the fourth horizontal side wall;
- there is a first height difference between an outer surface of the third horizontal side wall and an outer surface of the first elastic piece in the second axial direction, the first height difference is greater than or equal to a thickness of the first fixation structure in the second axial direction, there is a second height difference between an outer surface of the fourth horizontal side wall and an outer surface of the second elastic piece in the second axial direction, and the second height difference is greater than or equal to a thickness of the second fixation structure in the second axial direction; there is a third height difference between an outer surface of the fifth horizontal side wall and an outer surface of the third elastic piece in the second axial direction, the third height difference is greater than or equal to a thickness of the third fixation structure in the second axial direction, there is a fourth height difference between an outer surface of the sixth horizontal side wall and an outer surface of the fourth elastic piece in the second axial direction, and the fourth height difference is greater than or equal to a thickness of the fourth fixation structure in the second axial direction;
a first cross-section at a side end of the first light guide sub-member is perpendicular to the light-emitting surface, and a second cross-section at a side end of the second light guide sub-member is perpendicular to the light-emitting surface; and
the outer light guide member is provided with a plurality of first grooves, the inner light guide member is provided with a plurality of protruding structures, the circuit board is provided with a plurality of protruding portions and a plurality of second grooves, each of the protruding portions is locked in each of the first grooves respectively, and each of the protruding structures is locked in each of the second grooves respectively.

9. A light bar module, comprising:
an outer light guide member, provided with a first accommodating space and a light-emitting surface on two sides respectively;
an inner light guide member, provided with a second accommodating space, the inner light guide member being accommodated in the first accommodating space; and
a circuit board, provided with a plurality of light-emitting elements, each of the light-emitting elements being accommodated in the second accommodating space and being configured to emit light from the light-emitting surface;
wherein the outer light guide member comprises a left horizontal side wall, a right horizontal side wall, and a vertical side wall, the left horizontal side wall and the right horizontal side wall are parallel to each other, the vertical side wall is perpendicular to the left horizontal side wall and the right horizontal side wall, the vertical side wall comprises an inner wall, the inner wall is perpendicular to the left horizontal side wall and the right horizontal side wall, the vertical side wall connects to the left horizontal side wall and the right horizontal side wall, an axis perpendicular to the inner wall is defined as a first axial direction, an axis perpendicular to the left horizontal side wall or the right horizontal side wall is defined as a second axial direction, the first axial direction is perpendicular to the second axial direction, an acute angle is formed between the circuit board and the second axial direction, and a light-emitting direction of each of the light-emitting elements is perpendicular or parallel to the circuit board.

10. A light bar module, comprising:
an outer light guide member, provided with a first accommodating space and a light-emitting surface on two sides respectively;
an inner light guide member, provided with a second accommodating space, the inner light guide member being accommodated in the first accommodating space; and
a circuit board, provided with a plurality of light-emitting elements, each of the light-emitting elements being accommodated in the second accommodating space and being configured to emit light from the light-emitting surface;
wherein the outer light guide member comprises:
a first light guide sub-member, provided with a first sub-space; and
a second light guide sub-member, provided with a second sub-space, the first light guide sub-member and the second light guide sub-member being arranged side by side, and the first sub-space and the second sub-space forming the first accommodating space;
wherein the first light guide sub-member further comprises:
a first horizontal side wall;
a second horizontal side wall, parallel to the first horizontal side wall; and
a first vertical side wall, perpendicular to the first horizontal side wall and the second horizontal side wall, the first vertical side wall comprising a first inner wall, the first inner wall being perpendicular to the first horizontal side wall and the second horizontal side wall, and the first vertical side wall connecting to the first horizontal side wall and the second horizontal side wall; and
the second light guide sub-member further comprises:
a third horizontal side wall, at a same height as the first horizontal side wall;
a fourth horizontal side wall, at a same height as the second horizontal side wall; and
a second vertical side wall, perpendicular to the third horizontal side wall and the fourth horizontal side wall, the second vertical side wall comprising a second inner wall, the second inner wall being perpendicular to the third horizontal side wall and the fourth horizontal side wall, and the second vertical side wall connecting to the third horizontal side wall and the fourth horizontal side wall, wherein
the light-emitting surface comprises the first vertical side wall and the second vertical side wall; and the first light guide sub-member is provided with a first fixation structure extending from a first end portion of the first horizontal side wall and a second fixation structure extending from a second end portion of the second horizontal side wall, and the first light guide sub-member corresponds to the second light guide sub-member through the first fixation structure and the second fixation structure.

11. The light bar module according to claim 10, wherein the first fixation structure is provided with a first bump protruding toward the second horizontal side wall, and the second fixation structure is provided with a second bump protruding toward the first horizontal side wall; the second light guide sub-member further comprises a first elastic piece and a second elastic piece that are connected to the second vertical side wall, and a first concave portion is formed between the first elastic piece and a third end portion of the third horizontal side wall and is configured to accommodate the first bump; and a second concave portion is formed between the second elastic piece and a fourth end portion of the fourth horizontal side wall and is configured to accommodate the second bump.

12. The light bar module according to claim 11, wherein an axis perpendicular to the first inner wall is defined as a first axial direction, an axis connecting the first horizontal side wall to the second horizontal side wall is defined as a second axial direction, the second axial direction is perpendicular to the first axial direction, an outer surface of the first fixation structure is coplanar with an outer surface of the first horizontal side wall, and an outer surface of the second fixation structure is coplanar with an outer surface of the second horizontal side wall; and there is a first height difference between an outer surface of the third horizontal side wall and an outer surface of the first elastic piece in the second axial direction, the first height difference is greater than or equal to a thickness of the first fixation structure in the second axial direction, there is a second height difference between an outer surface of the fourth horizontal side wall and an outer surface of the second elastic piece in the second axial direction, and the second height difference is greater than or equal to a thickness of the second fixation structure in the second axial direction.

13. The light bar module according to claim 11, wherein an axis perpendicular to the first inner wall is defined as a first axial direction, an axis connecting the first horizontal side wall to the second horizontal side wall is defined as a second axial direction, the second axial direction is perpendicular to the first axial direction, and a projection position of the first end portion in the second axial direction is different from a projection position of the second end portion in the second axial direction; and a projection position of the third end portion in the second axial direction is different from a projection position of the fourth end portion in the second axial direction.

14. The light bar module according to claim 11, wherein an axis perpendicular to the first inner wall is defined as a first axial direction, an axis connecting the first horizontal side wall to the second horizontal side wall is defined as a second axial direction, the second axial direction is perpendicular to the first axial direction, and a projection position of the first bump in the second axial direction is different from a projection position of the second bump in the second axial direction; and a projection position of the first elastic piece in the second axial direction is different from a projection position of the second elastic piece in the second axial direction.

15. The light bar module according to claim 10, wherein the outer light guide member further comprises a third light guide sub-member, and the third light guide sub-member comprises:
  a fifth horizontal side wall, at a same height as the third horizontal side wall;
  a sixth horizontal side wall, at a same height as the fourth horizontal side wall; and
  a third vertical side wall, perpendicular to the fifth horizontal side wall and the sixth horizontal side wall, the third vertical side wall comprising a third inner wall, the third inner wall being perpendicular to the fifth horizontal side wall and the sixth horizontal side wall, and the third vertical side wall connecting to the fifth horizontal side wall and the sixth horizontal side wall, wherein
  the light-emitting surface comprises the first vertical side wall, the second vertical side wall, and the third vertical side wall; and the second light guide sub-member is provided with a third fixation structure extending from a fifth end portion of the third horizontal side wall and a fourth fixation structure extending from a sixth end portion of the fourth horizontal side wall, and the second light guide sub-member corresponds to the third light guide sub-member through the third fixation structure and the fourth fixation structure.

16. The light bar module according to claim 15, wherein the third fixation structure is provided with a third bump protruding toward the fourth horizontal side wall, and the fourth fixation structure is provided with a fourth bump protruding toward the third horizontal side wall; the third light guide sub-member further comprises a third elastic piece and a fourth elastic piece that are connected to the third vertical side wall, and a third concave portion is formed between the third elastic piece and a seventh end portion of the fifth horizontal side wall and is configured to accommodate the third bump; and a fourth concave portion is formed between the fourth elastic piece and an eighth end portion of the sixth horizontal side wall and is configured to accommodate the fourth bump.

17. The light bar module according to claim 16, wherein an axis perpendicular to the third inner wall is defined as a first axial direction, an axis connecting the fifth horizontal side wall to the sixth horizontal side wall is defined as a second axial direction, the second axial direction is perpendicular to the first axial direction, an outer surface of the third fixation structure is coplanar with an outer surface of the third horizontal side wall, and an outer surface of the fourth fixation structure is coplanar with an outer surface of the fourth horizontal side wall; and there is a third height difference between an outer surface of the fifth horizontal side wall and an outer surface of the third elastic piece in the second axial direction, the third height difference is greater than or equal to a thickness of the third fixation structure in the second axial direction, there is a fourth height difference between an outer surface of the sixth horizontal side wall and an outer surface of the fourth elastic piece in the second axial direction, and the fourth height difference is greater than or equal to a thickness of the fourth fixation structure in the second axial direction.

18. The light bar module according to claim 16, wherein an axis perpendicular to the third inner wall is defined as a first axial direction, an axis connecting the fifth horizontal side wall to the sixth horizontal side wall is defined as a second axial direction, the second axial direction is perpendicular to the first axial direction, and a projection position of the fifth end portion in the second axial direction is different from a projection position of the sixth end portion in the second axial direction; and a projection position of the seventh end portion in the second axial direction is different from a projection position of the eighth end portion in the second axial direction.

19. The light bar module according to claim 16, wherein an axis perpendicular to the third inner wall is defined as a first axial direction, an axis connecting the fifth horizontal side wall to the sixth horizontal side wall is defined as a second axial direction, the second axial direction is perpendicular to the first axial direction, and a projection position of the third bump in the second axial direction is different from a projection position of the fourth bump in the second axial direction; and a projection position of the third elastic piece in the second axial direction is different from a projection position of the fourth elastic piece in the second axial direction.

* * * * *